(12) United States Patent
Ramey et al.

(10) Patent No.: US 10,362,359 B2
(45) Date of Patent: Jul. 23, 2019

(54) VIDEO PLAYER FRAMEWORK FOR A MEDIA DISTRIBUTION AND MANAGEMENT PLATFORM

(71) Applicant: USTUDIO, INC., Austin, TX (US)

(72) Inventors: John Ramey, Austin, TX (US); Josh Marshall, Austin, TX (US); Emerson F. Lane, III, Austin, TX (US); Thomas Stephens, Austin, TX (US); Brian Matheny, Austin, TX (US)

(73) Assignee: uStudio, Inc., Austin, TX (US)

( * ) Notice: Subject to any disclaimer, the term of this patent is extended or adjusted under 35 U.S.C. 154(b) by 0 days.

(21) Appl. No.: 16/061,698

(22) PCT Filed: May 26, 2016

(86) PCT No.: PCT/US2016/034263
§ 371 (c)(1),
(2) Date: Jun. 13, 2018

(87) PCT Pub. No.: WO2017/105542
PCT Pub. Date: Jun. 22, 2017

(65) Prior Publication Data
US 2018/0376209 A1     Dec. 27, 2018

Related U.S. Application Data

(60) Provisional application No. 62/266,640, filed on Dec. 13, 2015.

(51) Int. Cl.
*H04N 21/472* (2011.01)
*H04N 21/81* (2011.01)
(Continued)

(52) U.S. Cl.
CPC ........... *H04N 21/472* (2013.01); *G06F 16/78* (2019.01); *H04L 67/327* (2013.01); *H04N 19/40* (2014.11);
(Continued)

(58) Field of Classification Search
CPC ............. H04N 21/812; H04N 21/4622; H04N 21/4532; H04N 21/4782; H04N 5/44543;
(Continued)

(56) References Cited

U.S. PATENT DOCUMENTS

| 8,010,692 | B1 | 8/2011 | Shanson et al. |
| 8,069,414 | B2 | 11/2011 | Hartwig et al. |

(Continued)

FOREIGN PATENT DOCUMENTS

| WO | 2012166154 | 12/2012 |
| WO | 2013166178 | 11/2013 |

OTHER PUBLICATIONS

The International Searching Authority, "Notification of Transmittal of the International Search Report and the Written Opinion of the International Searching Authority, or the Declaration", dated Sep. 13, 2016 in International Application No. PCT/US2016/034263, 10 pages.

(Continued)

*Primary Examiner* — Hsiungfei Peng
*Assistant Examiner* — Fred Peng
(74) *Attorney, Agent, or Firm* — Trop, Pruner & Hu, P.C.

(57) ABSTRACT

An embodiment includes receiving a first request for first video content and a first video player from a client; in response (a)(i) obtaining first source code for the first video player, (a)(ii) obtaining a first configuration file for the first video player, (a)(iii) obtaining a first player module corresponding to the first video player, and (a)(iv) communicating same to the client. The first video player comprises code to
(Continued)

play video via a graphical user interface. The first player module comprises code that, in response to the first player module subscribing to a first event bus of a pub/sub system, performs a first routine in response to: (b)(i) a first publication to the first event bus from an additional player module that corresponds to the first video player, and (b) (ii) execution of a first callback function corresponding to the first publication.

20 Claims, 18 Drawing Sheets

(51) Int. Cl.
  *H04N 19/40* (2014.01)
  *G06F 17/30* (2006.01)
  *H04L 29/08* (2006.01)
  *H04N 21/858* (2011.01)
  *G06F 16/78* (2019.01)

(52) U.S. Cl.
  CPC ... *H04N 21/47217* (2013.01); *H04N 21/8166* (2013.01); *H04N 21/8186* (2013.01); *H04N 21/8586* (2013.01)

(58) Field of Classification Search
  CPC ............... H04N 5/76; H04N 7/17318; H04N 21/44222; H04N 21/458; H04N 7/163; H04N 21/4331
  See application file for complete search history.

(56) References Cited

U.S. PATENT DOCUMENTS

| | | | |
|---|---|---|---|
| 8,112,702 | B2 | 2/2012 | Badoiu et al. |
| 8,151,182 | B2 | 4/2012 | Datar et al. |
| 8,468,562 | B2 | 6/2013 | Miller et al. |
| 8,813,132 | B2 | 8/2014 | Andrews, II et al. |
| 2002/0104096 | A1 | 8/2002 | Cramer et al. |
| 2007/0133692 | A1 | 6/2007 | Reddy et al. |
| 2008/0028037 | A1 | 1/2008 | Moyer et al. |
| 2008/0232460 | A1 | 9/2008 | Sadowski et al. |
| 2008/0276272 | A1 | 11/2008 | Rajaraman et al. |
| 2009/0149743 | A1* | 6/2009 | Barron .................. A61M 5/007 600/431 |
| 2009/0199230 | A1* | 8/2009 | Kumar .................. G06Q 30/02 725/32 |
| 2010/0128778 | A1 | 5/2010 | Ji et al. |
| 2010/0198697 | A1* | 8/2010 | Brown .................. G06Q 30/02 705/14.73 |
| 2011/0119700 | A1* | 5/2011 | Hamilton ......... H04N 21/25883 725/32 |
| 2011/0276881 | A1 | 11/2011 | Keng et al. |
| 2014/0198851 | A1 | 7/2014 | Zhao et al. |
| 2014/0215542 | A1 | 7/2014 | Terpe |

OTHER PUBLICATIONS

Wikipedia, "Publish-subscribe pattern", May 9, 2016, pp. 1-5, https://en.wikipedia.org/wiki/Publish-subscribe_pattern.
Wikipedia, "Modular programming", May 9, 2016, pp. 1-4, https://en.wikipedia.org/wiki/Modular_programming.
Wikipedia, "Callback (computer programming)", May 9, 2016, pp. 1-7, https://en.wikipedia.org/wiki/Callback_(computer_programming).
Wikipedia, "Media player (software)", May 9, 2016, pp. 1-2, https://en.wikipedia.org/wiki/Media_player_(software).
Soskey, "How to Add HTML Embed Codes to Your Website [Quick Tip]", Sep. 11, 2013, pp. 1-18, https://blog.hubspot.com/marketing/how-to-add-html-embed-codes-ht.
uStudio, "uStudio Video Platform Chosen to Power CES and the Consumer Electronics Association's Online Member Community", Sep. 17, 2014, two pages.
uStudio, "Ace Hardware Chooses uStudio Video Platform to Drive Its Retail Training Program", Jul. 29, 2014, two pages, https://www.yahoo.com/amphtml/finance/news/ace-hardware-chooses-ustudio-video-120000799.html.
uStudio, "uStudio Launches VideoShare for Salesforce", Jul. 23, 2014, two pages, http://www.marketwired.com/press-release/ustudio-launches-videoshare-for-salesforce-1932008.htm.
uStudio, "uStudio Feature Highlight: Playlist Player", Oct. 25, 2013, uStudio Blog, one page.
Marshall, "Flash Security Issues in an HTML5 World", Jul. 16, 2015, uStudio Blog, two pages, https://ustudio.com/blog/industry-trends/flash-security-issues-html5-world/.
European Patent Office, Extended European Search Report dated Apr. 12, 2019 in European Patent Application No. 16876184.9.

* cited by examiner

```
{
   "event": "Player.seekto",
   "arguments": [{"value": 15.6}],
   "id": "PLAYER UNIQUE IDENTIFIER"
}
```

FIG. 2

```
(function() { uStudio.uStudioCore.instance.registerModule({ name: "cta_module",

// @configuration is an object with the module-specific config
    // @events is the event bus for broadcast and subscribe
    // @videos is the list of videos for the player and the metadata
    initialize: function(configuration, events, videos) {

// the event bus is used to subscribe to specific events from
      // other modules as well as broadcast custom events.
      events.subscribe('Player.finished', function(event) {
        display_image(image_url=config.cta_image, link=config.cta_url);
      });

```
curl -X POST https://api.ustudio.com/modules --data-binary '\
{\
  "name": "cta_module", \
  "label": "uStudio CTA Module", \
  "file": "http://ustudio.com/cta_module.zip", \
  "default_configuration": [\
    {"uid": "cta_image", "type": "file", "required": true}, \
    {"uid": "cta_url", "type": "string", "required": true}\
  ]\
}'
```

FIG. 6

```
curl -X POST https://api.ustudio.com/destinations/DESTINATION_ID/modules --data-binary '\
{\
  "uid": "MODULE UNIQUE IDENTIFIER", \
  "configuration": {\
    "cta_image": "http://ustudio.com/cta_image.jpg" \
    "cta_url": "http://ustudio.com"\
  }\
}'
```

FIG. 8

VIDEO PLAYER FRAMEWORK FOR A MEDIA DISTRIBUTION AND MANAGEMENT PLATFORM

PRIORITY CLAIM

This application claims priority to U.S. Provisional Patent Application No. 62/266,640 filed on Dec. 13, 2015 and entitled "Video Player Framework for a Media Distribution and Management Platform", the content of which is hereby incorporated by reference.

TECHNICAL FIELD

Embodiments of the invention are in the field of video and, in particular, video management and distribution.

BACKGROUND

As enterprise organizations continue to embrace the pervasiveness of video and its impact on network security, storage, content, and communication, an organization's employees, partners, and customers will expect video to be integrated into core business processes and to function more like email: easily created, shared, viewed, and searched across all devices and applications. Use cases will expand beyond the traditional broadcast-oriented model into video conversations, shared video moments such as brief screen captures or custom video messages, and interactive, personalized experiences.

As a result, distributed enterprises have moved beyond the need to simply publish a video to a website using previous-generation video players based on browser plugins or proprietary technologies, such as Adobe Flash®, Microsoft Silverlight®, and Microsoft Windows® Media. These players require specialized scripting and knowledge, are inflexible to alteration, and provide a limited number of playback environments (e.g., web only, desktop only, Windows only, Internet Explorer only, etc.) These player providers also often limit player customization to a single business use case and/or a single metadata and transcode model. Consequently, organizations that use previous-generation video players are forced to maintain a multitude of niche, single-purpose video players and providers, which are costly, decentralized, and challenging to manage over time. Enterprises and the agencies supporting them need the ability to quickly build custom player experiences across all devices and application environments via a flexible framework designed and approved for business users and with minimal development resources.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 2-3 include pseudocode for embodiments of the invention.

FIG. 6 includes pseudocode for an embodiment of the invention.

FIG. 8 includes pseudocode for an embodiment of the invention.

DETAILED DESCRIPTION

Figure 1:
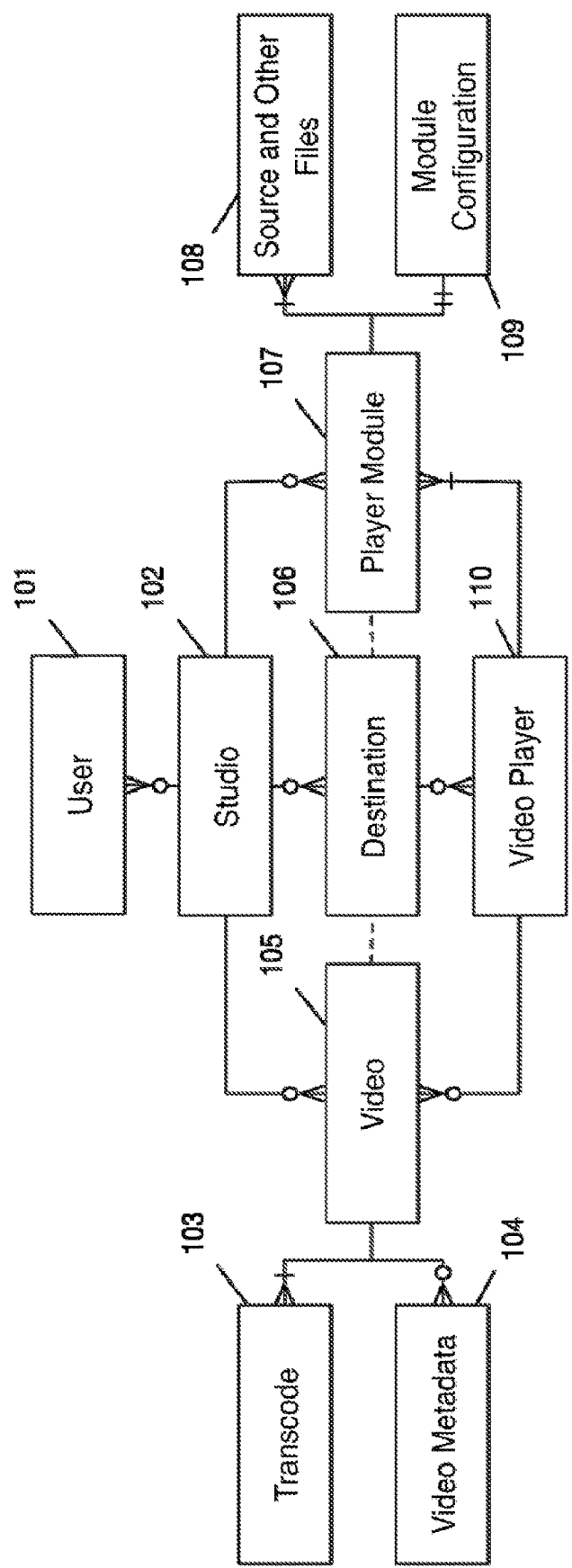
FIG. 1 includes a hierarchy diagram of a video player framework (sometimes referred to herein as "video player") for media distribution and management in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment. At times herein descriptions cover several different figures at once. For clarity, figures include components where the most significant value denotes the figure that includes the component (e.g., element 3XX would be found in FIG. 3 and element 4XX would be found in FIG. 4).

An embodiment of the invention employs a "player framework" (i.e., "video player") to expose a broad set of discrete, modular video capabilities through intuitive, highly connected, modern application programming interfaces (API) that are easy to use across a wide variety of business applications and workflows. The "player framework" is a platform that allows flexible video-delivery options including a variety of video-playback formats and streaming methods across devices, networks, and application environments.

An embodiment of the invention enables custom video-player delivery, functionality, and user experience through the player framework. Using a system of player modules, communicating over a central event bus from a publication/subscription (pub/sub) software architecture, users can combine individual player components to create unique player experiences within video platforms and application environments. Player modules within the player framework allow flexible customization and deployment of interactive video-player experiences on these platforms.

An embodiment of the invention enables internal and third-party applications to extend and to customize solutions for video management and distribution and to create libraries of reusable components for external platforms and application environments. Such libraries may form a marketplace for developers to add player modules that content providers purchase.

In FIG. 1, blocks 101-110 illustrate the relationship among resources within the player framework. In block 102, a central resource to the player framework is the "studio": a collection of "videos," "destinations" to which these videos are published, and "users" who can manage and distribute these videos. In block 101, a studio consists of zero or more "users." A "user" refers to an individual user account, which may be associated with one or more studios in a variety of roles to facilitate simple organization management without complicated access-control rules.

A studio manages and organizes a collection of zero or more "videos." Blocks 103-105 demonstrate that a "video" refers to an original video file or video stream (block 105), transcoded variations (block 103), streaming uniform resource locators (URL), etc. and the associated metadata (title, description, preview image, etc.) (block 104) used for publishing the video to zero or more destinations. The video also tracks a thumbnail and various metadata about the video's contents, including management and collaboration details, closed captions and subtitles, descriptions of the contents of the videos, summaries and keywords for searching the video within a database, etc. The video may be as simple as an unedited cut from a camera or production, a finished edit that requires approval from a collaborator or client, a final version ready for distribution, a live-stream audio or video broadcast, or any of the stages in between.

An embodiment of the invention enables deployment of video assets, metadata, and supplementary content, documents, and files (e.g., coupons, training materials, airline tickets, concert tickets, PDF documents, Microsoft Word® documents, Microsoft Excel® spreadsheets, Microsoft PowerPoint® slides) to a wide variety of "destinations." As defined by Marshall, J., (2014) U.S. Pat. No. 8,826,332, a "destination" is an authorized platform for publishing videos, managing the requirements for authenticating users, publishing videos, tracking activity, and removing the concerns of transcoding, packaging, and delivery. A "destination" allows some combination of publishing, updating, unpublishing, and statistics retrieval of videos files and video streams. Each destination may require transcoding a video to one or more required formats or may require delivery via a network (e.g., API, file transfer protocol (FTP), content delivery networks (CDN)). "Destinations" include a wide variety of video platforms and application environments, including smart TVs (e.g., Sony Bravia), over-the-top (OTT) players (e.g., Roku®, Chromecast®, Apple TV®), digital media players (e.g., Quicktime®, Android®), and video-sharing websites (e.g., YouTube®, Facebook®). On some platforms the player layout (e.g., where a "play" button is located and how the button looks to the user) may be determined by standard web technologies, including HTML, CSS, and JavaScript, whereas on other platforms (e.g., native mobile applications, OTT platforms such as Apple TV® and Roku®) proprietary technologies (e.g., Brightscript on Roku® devices) and software-development tools (e.g., Apple Xcode® to develop for Apple TV® and iOS®-based mobile devices) may be required to customize the presentation, visual layout, interactivity, and activity tracking around the video content.

Block 106 demonstrates that a studio contains zero or more destinations. In block 106 an embodiment packages a video (from block 105) according to the individual destination platforms and abstracts various underlying systems. Because video delivery requirements change frequently and previous-generation video standards (e.g., FLV, Flash, RTMP) become less relevant, new distribution formats and platforms emerge (e.g., MPEG DASH, HLS, OTT, WebRTC). Thus, in blocks 103-106 an embodiment abstracts the various video "transcodes." For instance, an embodiment may choose to hide transcoding a video file or video stream (e.g., recompressing or repackaging video content into an alternate digital stream or video format) as an implicit part of publishing to or updating a video via the player framework. In blocks 103-106, after a video has been published to one or more destinations, the video, its metadata, and its supplementary content are available to the player modules (block 107)(discrete units for handling portions of the media player (block 110) operation) for runtime usage. For instance, when an embed code for a video is requested, a downloadable PowerPoint® presentation may be included with the video and the player. In this example, the player may include a customizable link, button, or other call-to-action (CTA) interface to enable viewers to download the presentation.

In block 106, destinations include web platforms (e.g., default HTML5 player), OTT platforms (e.g., YouTube®, Hulu®, Apple TV®, Roku®), or any custom environment enabled for a studio. Blocks 105 and 106 indicate that video assets within the studio can be published to any of these destinations. A "destination configuration" file or code is used to specify the various video and player delivery configurations for a destination within the player framework. For instance, a destination configuration for YouTube may restrict the video resolution, format, playback length, etc. The destination configuration has default values but can be overwritten by the user.

Player Modules

Still addressing FIG. 1, an embodiment of the invention enables creation, development, deployment, and management of player modules using a variety of programming languages, technologies, and applications environments, including Java for Android®, Objective C and Swift for iOS® and Mac OS X®, Brightscript for Roku® applications, etc. In blocks 107-109, player modules (block 107) consist of source files (block 108) responsible for the entire experience of a video player, including determining the best streaming quality and format, constructing the visual layout, and capturing data for reporting and analytics. A player module's source files, configuration file (which, for example, may dictate the play button of a user interface module is blue) (block 109), and additional files are validated to ensure performance, security, and compatibility with the destination and its application environment. For example, the player framework will invalidate a module implemented in Swift but deployed to a Roku® destination requiring the Brightscript language.

A video player includes a core library, which is responsible for setting up the "event bus" of the pub/sub architecture and player modules when the player is loaded. A player module registers a callback function with the video player's core library. This callback function is called by the video player's core library after a viewer requests the video(s) and player via an embed code. The "event bus" and player module's "configuration" are passed as arguments to the callback function. The "event bus" is the primary method of communication between modules. By publishing or subscribing to events, player modules may perform operations dependent on the events published by other modules rather than their specific code implementations. This approach also allows for dynamic swapping of conceptual components with no change to other, dependent modules. In block 109, a player module includes a "module configuration" that specifies configuration arguments to customize the module. A configuration argument is specified with a unique name and is given field types (e.g., integer, boolean, file, string, float). In the module configuration (block 109), a module may require argument values be specified before deploying the module to a player within a destination.

In an embodiment of the invention a video is referenced by an "embed code", which is a URL that when requested returns a given set of video(s) within the destination, the video "player" for this destination is loaded or delivered to the requesting client. The player includes the core HTML and JavaScript, the "player configuration", and "player modules."

In block 110, a "video player" is comprised of video (block 105), player modules (block 107), a destination (block 106)(e.g., a player for Facebook "includes" Facebook as a destination for the player), and the destination's application environment(s) (e.g., web, native iOS, AppleTV, etc.). A video player has a unique identifier (accessed via the embed code in some embodiments) to specify the studio (block 102) to which it belongs, the set of modules (block 107) used by the player, the modules' source code (block 108), metadata (block 108), configuration (block 109), and additional files (block 108), and the destination (block 106) to which the player is deployed. Videos (block 105) authorized for distribution to this destination are played via the player (block 110). Within a studio (block 102), a destination can have multiple players (e.g., one for Twitter that has an email requesting CTA module and/or an analytics module for tracking user clicks and another for Twitter that does not have one or both of the CTA module and the analytics module). It follows that a studio can have multiple players (e.g., one for Facebook and one for Twitter). Video metadata and module configuration are provided dynamically at runtime to each player instantiation.

Blocks 107 and 110 illustrate that a player (block 110) is composed of a series of configurable modules (block 107) responsible for every aspect of player functionality, such as seeking into a video, selecting a video within a video playlist, rendering user-interface controls, and video-quality, transcode, and streaming selection.

In an embodiment a player has a "default configuration" with a default visual layout and standard video playback options. The "default configuration" is determined by the player's destination. For instance, the "default configuration" for an HTML5 player is composed of a default series of configurable JavaScript modules responsible for player functionality, such as UI presentation (including HTML and CSS) and video streaming decisions.

A user can extend the core functionality of the player with custom player modules. For instance, a player module available by default enables a developer to override the HTML and/or CSS within the "default configuration" of an HTML5 player to customize a player's appearance and user experience. The player UI may be overridden by providing a theme module that loads valid HTML code and associated static files, such as CSS and images. Additionally, an HTML5 player may include JavaScript logic inside a playback module to revert to a Flash or plugin-based playback option within an older browser that does not support the standard <video> tag. An alternative implementation of this module (e.g., a native Android application written in Java) might decide between HTTP- or RTMP-based streaming, depending on the environments supported.

An embodiment of the invention utilizes serializable events (pub/sub events) in the event bus to enable communication between player modules across a communication device. In many application environments, the outer application code (e.g., browser code that interacts with player it hosts) may also take advantage of the event bus and communicate with the modules, functioning as an additional module. For instance, in a web application that uses an <iframe> embed, JavaScript on the outer page may use the postMessage interface to broadcast and receive events from inside the player, allowing the rest of the page to trigger any action or state a user module may provide.

In an embodiment messages sent between the player, player modules, and the application environment are communicated using JavaScript Object Notation (JSON) by default, although the actual mechanism of serialization is tailored to the application environment.

FIG. 2 includes an example of a player-seek pub/sub event (to which other modules may subscribe) in pseudo-code resembling JSON. The event name is the primary action identifier and may be namespaced according to the module that defined it. The event name may represent a call to action (CTA) or an indication that an action has occurred (e.g., Player.seeking, Player.seeked). The arguments list represents any variable information that may be needed by a subscribing module. In the player-seek example, the viewer has triggered a seek event to 15.6 seconds into the video. The id value uniquely identifies the player that is broadcasting the event.

FIG. 3 illustrates pseudocode resembling JavaScript for an example CTA player module within an HTML5 video player. The example player module displays a CTA image along with a link to an external website after the viewer has finished watching the video requested (but in other embodiments the CTA may be before the video is watched such as FIG. 10). This example represents a common use case where a viewer may attain more information regarding the content of the video by clicking a CTA image.

Figure 4:
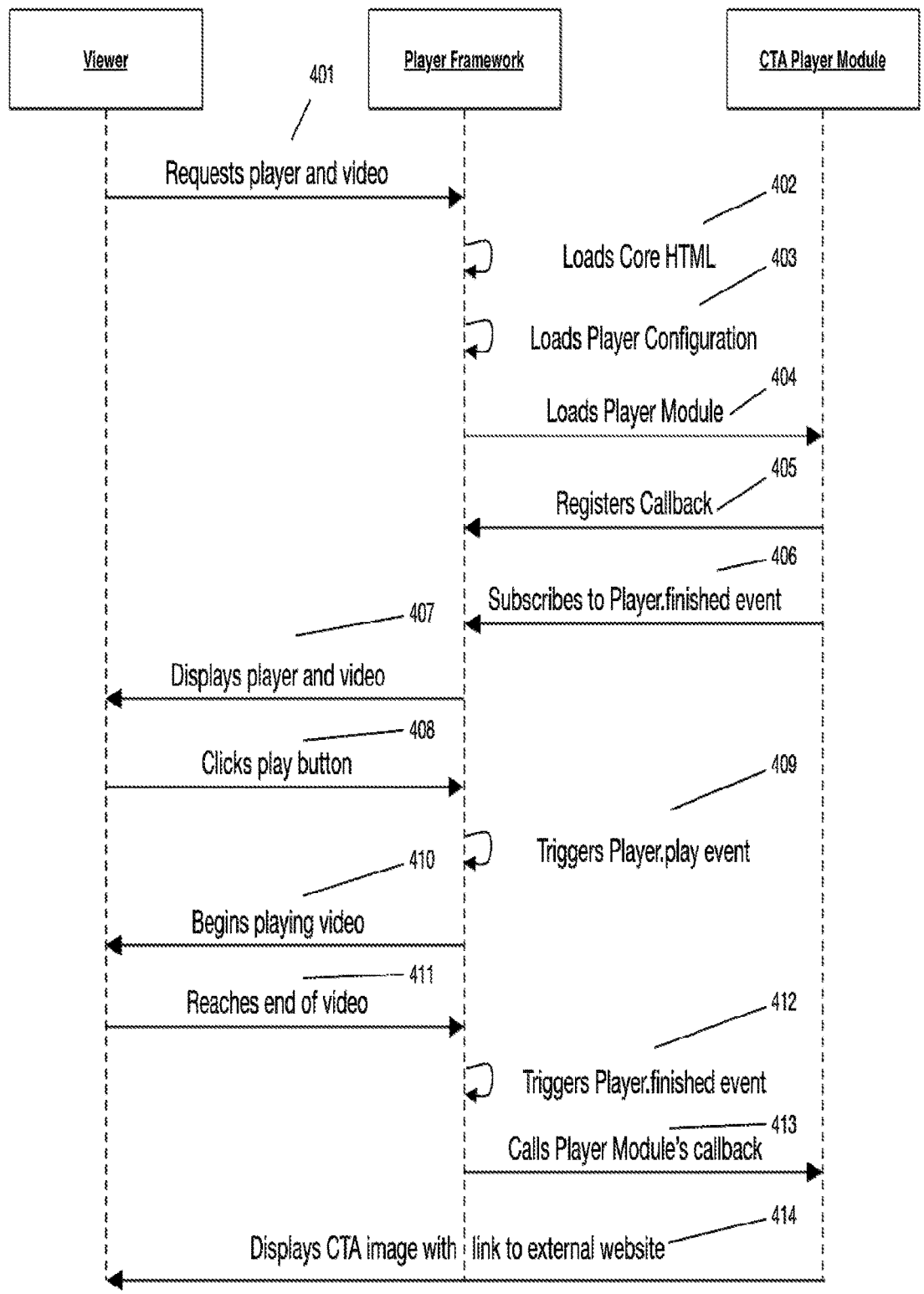
FIG. 4 includes a player module sequence diagram of an embodiment of the invention. The diagram addresses coupling between a viewer, a player, and a player module.

Continuing with the example CTA player module from FIG. 3, FIG. 4 displays a sequence diagram with the steps employed by the player framework when loading and executing the instructions within the CTA player module. In block 401, the viewer (e.g., a client) requests the video and player using an embed code. In blocks 402-403, the video player deployed by the player framework (e.g., a server) loads the Core HTML and Player Configuration that correspond to the player asked for (directly or indirectly) in the embed code. In block 404, the video player loads various modules, including the Player Frame and Player Controls modules as well as the user-created CTA player module (which is the focus in this example).

In block 405, the CTA player module registers a callback with the video player. In block 406, the CTA player module subscribes to a Player.finished event on the event bus. This may occur on the client but may also occur on a server or other computing node. Thus, the "framework" of FIG. 4 may be distributed amongst a client (e.g., where embed code is used) and/or a server (where player modules are stored before being deployed to a viewer's client). In block 407, the player and video are loaded onto the client and displayed to the viewer. In block 408, the viewer clicks the play button in the viewer, causing the Player Control module to trigger a Player.play event in block 409. In block 410, subscribing to the Player.play event, the Player Frame module starts the video when the event is triggered. In block 411, the video playback continues until the end of the video is reached by the viewer. In block 412, the Player.finished event is triggered by the video player. In block 413, the video player calls the CTA player module's callback, passing in to the framework the CTA player module's configuration, event bus, and the video's metadata. In block 414, the CTA player module receives the Player.finished event and displays the image specified in the CTA player module's configuration (e.g., a prompt asking for email or other contact information). If the viewer clicks the image displayed, the viewer is taken to the URL specified in the CTA player module configuration.

Player API

An embodiment of the invention includes an API as an external interface for management of all resources in the player-framework system. Default module, third-party module, and custom player-module source code, metadata, and configurations are managed via the API, allowing extension or replacement of player behavior. Through a "token," an external application may make requests on behalf of a user, and subsequently access all authorized studios, destinations, videos, etc. A "token" is a software key utilized by other software applications to uniquely identify and authenticate a user to use the API.

In block 501, an embodiment of the invention enables users to create (e.g., FIG. 6) and to manage a player module within the player framework via the API. In block 502, the user uploads a player module, the player-module source code, the module configuration, and additional files used by the module (e.g., images, CSS, etc.) using the API. In block 503, the player framework via the API validates the presence of legitimate source code, module metadata, and additional files, such as images, videos, etc. If the player module's source code, metadata, configuration, or additional files are invalid, the player module is rejected in block 504. In block 505, an error message, an error code, and additional information are sent to the user via the API. Returning to block 503, if the player module's source code, metadata, configuration, and additional files are validated, the files are stored on a file server by the player framework. Player-module configuration and accompanying metadata are stored in a database along with the player module's unique identifier. In block 506, the player module is made available to the users and destinations authorized for usage within the user's studio. For example, a studio may be a business, a unit of the business, a collaboration group between two businesses, and the like. In block 507, a success code, success message, and additional information about the player module are sent to the user via the API, including the player module's unique identifier generated, creation timestamp, and other details describing the player module stored within the player framework. Standard read, update, and deletion operations can be applied to the module via the API by referencing the player module's unique identifier.

Continuing with the CTA module example, FIG. 6 employs a command line HTTP client called cURL to create a player module named cta_module with a label "uStudio CTA Module" within the player framework via the API. Client or server-side code for a web application, native code in a mobile app, or any other client that supports HTTP could be used instead of the cURL tool. For brevity, other important operations, such as updating and deleting modules are not demonstrated. The configuration arguments indicate that a CTA image is displayed when a video has finished playing. If the user clicks the CTA image specified in cta_image, the user is taken to the URL specified in cta_url within the module configuration. The cta_image argument is a file type, whereas cta_url is stored as a string type. Both the arguments cta_image and cta_url are required when the module is added to a destination. The player module's source code can be uploaded to the player-framework system either from a local computer or from a remote server as a compressed format (e.g., ZIP file, tar archive) or as a set of files containing the source code. In the CTA player module example, the player module's source code is provided as a ZIP file named cta_module.zip located at http://ustudio.com.

Figure 5:
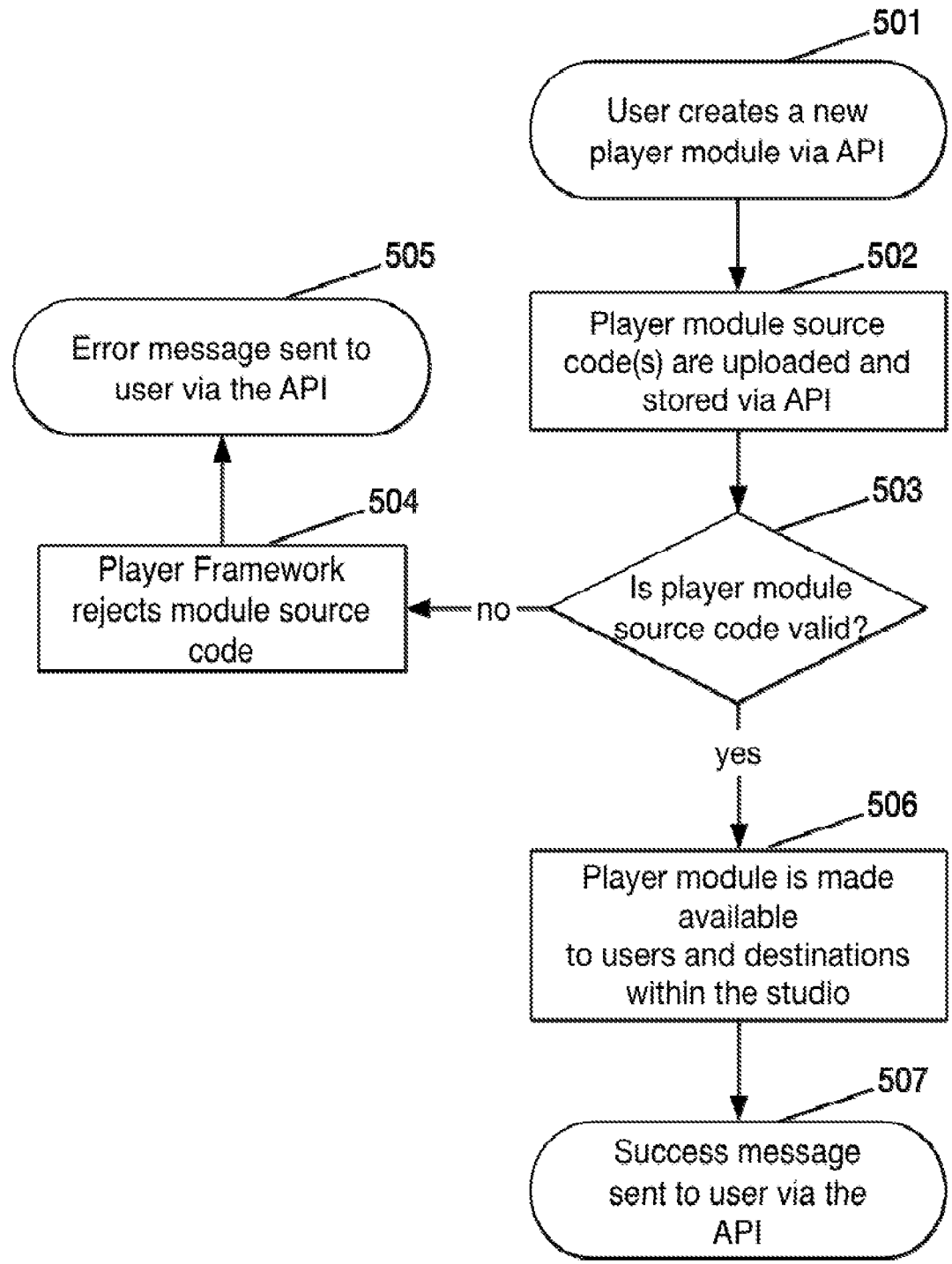
FIG. 5 includes a process for player-module creation in an embodiment of the invention.
Figure 7:
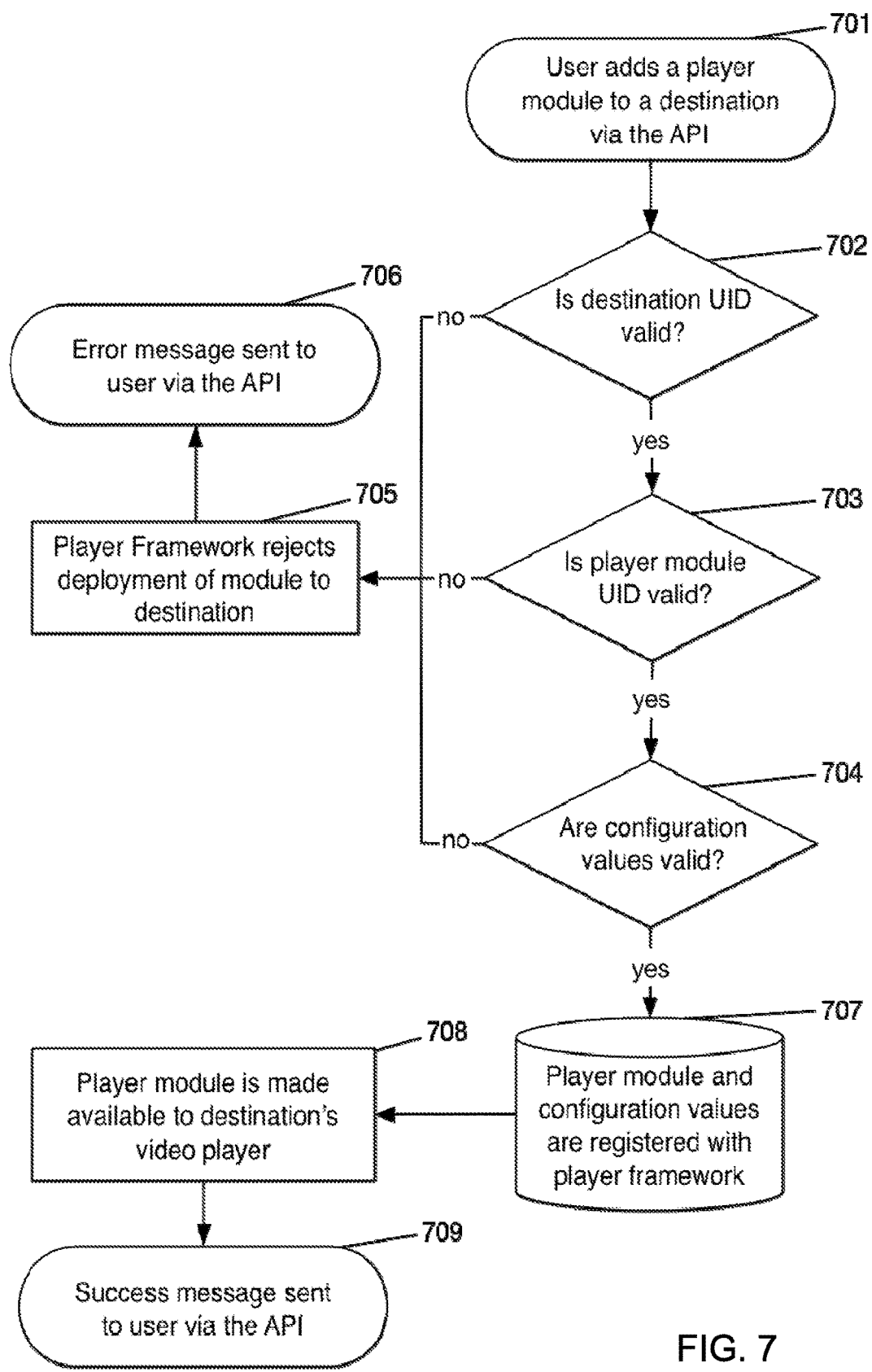
FIG. 7 includes a process for player module deployment in an embodiment of the invention.

After a player module has been created (FIG. 6) and validated (FIG. 5) within the player framework, an embodiment of the invention enables users to manage player modules and to make them available to destinations within the user's studio (FIG. 7).

In FIG. 7, with block 701 the user adds a player module registered with the player framework to a destination via the API. Blocks 702-703 validate that the destination and player modules unique identifiers exist within the player framework and that the user's account has been authorized to read and to edit the player module's and destination's properties. Block 704 validates the module configuration values specified by the user to ensure that required fields are given and that the values provided satisfy the configuration field types. If the destination or module unique identifiers or the module configuration values are invalid, the player module is rejected from deploying the module to the specified destination in block 705. In block 706, an error message, an error code, and additional information are sent to the user via the API. Returning to blocks 702-704, if the destination and module unique identifiers and the module-configuration values are validated, the player module, module configuration values, and accompanying metadata are registered with player framework and stored in a database along with both the player module's and destination's unique identifiers in block 707. In block 708, the player module is made available to the video player deployed to the destination in application environments in which the destination is configured. In block 709, a success code, success message, and additional information about the player module are sent to the user via the API, including the timestamp and other metadata describing the player module's deployment to the destination and its application environment. Standard read, update, and deletion operations can be applied to the player module registered to the destination via the API by referencing both the player module's and destination's unique identifiers.

Continuing with the player-module creation example, FIG. 8 illustrates how a user can make the player module available to a destination via the API by referencing the player module's unique identifier along with the destination's unique identifier specified in the DESTINATION_UID parameter using a command line HTTP client called cURL. Client or server-side code for a web application, native code in a mobile app, or any other client that supports HTTP could be used instead of the cURL tool. For brevity, other important operations, such as updating and deleting modules are not illustrated. The player module's unique identifier is specified in the uid field. The player-module configuration is provided in the configuration field. Specifically, the CTA image specified by the user is the file named cta_image.jpg located at http://ustudio.com. When a viewer clicks the cta_image.jpg image, the viewer is sent to the link specified in cta_url, namely, http://ustudio.com.

Within a studio, multiple player modules may be authorized for configuration on a destination. Multiple player modules can also be deployed to the same destination. A destination-specific configuration may be provided for a player module, overriding the default module configuration. By default, destinations use a predefined set of default modules, which can be replaced or extended.

FIGS. 10 to 23 demonstrate three examples that employ player modules to add or replace standard playback behavior, aesthetics, and functionality within a standard video player.

Figure 10:
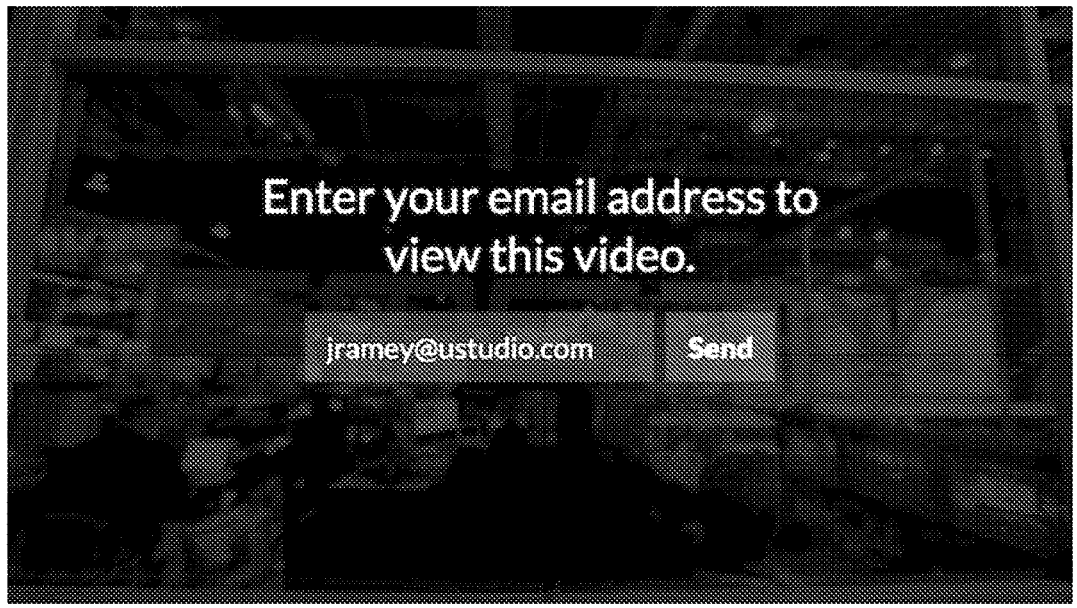
FIG. 10 includes an example implementation of an embodiment of the invention.

FIG. 10 illustrates an example video player where a gateway requires valid user input (e.g., a valid email address) before the viewer can watch a video. The ability to employ a gateway before, during, or after video playback is valuable for a variety of use cases, including: (1) sales lead generation by embedding a gateway to a product overview video, (2) generating marketing leads for a company brand after a compelling video has been viewed, (3) asking the viewer to enter a phone number for a return call from a support or sales representative, and/or (4) tailoring the video based on the viewer response to questions such as role, company size, or ZIP code.

In the email gateway example, a gateway player module is added to a standard video player. The gateway player module and its module configuration determine the appearance and layout of the gateway, including the layout of the textbox and button, the text to prompt the viewer, and the amount of transparency of the overlaid image. After the viewer inputs an email address, the gateway module validates the email address. If the email address is invalid, an error message is shown to the viewer, and the viewer may input another email address. After the viewer inputs a valid email address, the gateway player module sends the email address to at least one of a database, a server, or a third-party service as specified in the gateway player module's configuration.

After the viewer has submitted a valid email address, the gateway player module allows the video player to display the video and the standard video playback controls (e.g., play button). The gateway player module also stores either a cookie or other data on the viewer's local machine. After this data has been stored on the viewer's local machine, if the viewer refreshes the video player or returns to the video player at a later time, the gateway player module does not prompt the viewer with an additional email gateway in order to minimize viewer frustration.

The gateway player module provides optional configurations and functionality. An optional server-side component can be included to ensure the viewer submits a valid email address. This server-side component provides additional security to ensure that a viewer does not bypass the gateway. The gateway player module also has the ability to randomly or systematically select whether the gateway input form is displayed. Because a gateway may reduce the willingness of a viewer to watch the video, this option has the advantage of reducing the number of viewers who must submit a valid email address. For example, a version of the module may allow for random requests of the email whereas another version of the same player module may make the gateway mandatory. Moreover, when paired with tracking and analytics player modules, an estimate for the proportion of viewers that are willing to input an email address can be computed and stored, providing insight about the tradeoffs of collecting more viewer email addresses versus the number of viewers who are unwilling to view the video after prompted by a gateway.

Figure 11:
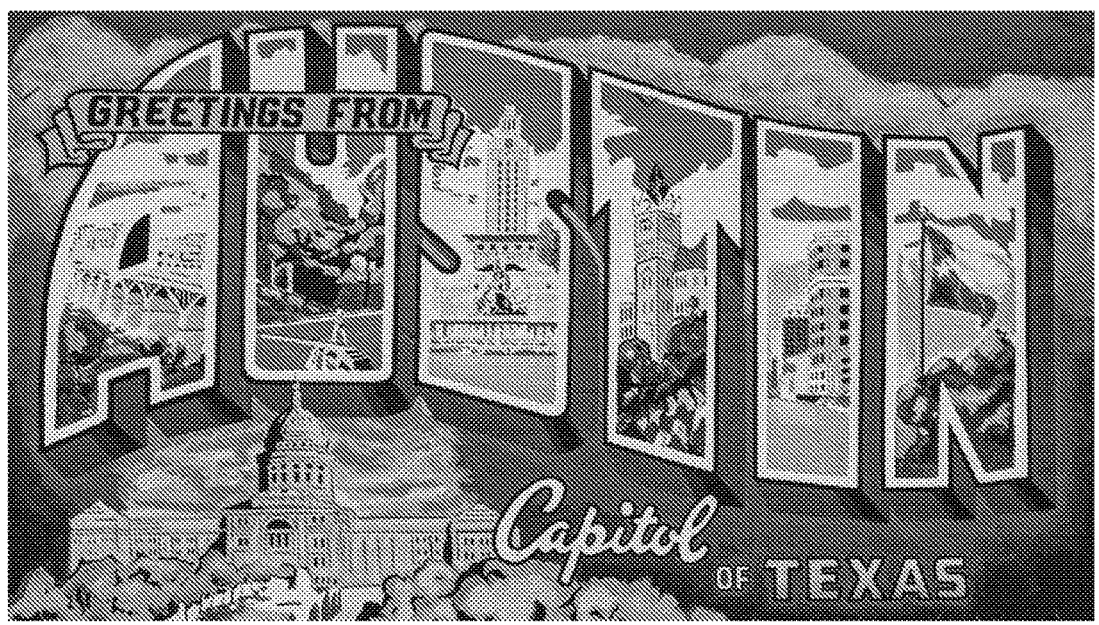
FIGS. 11-15 include a video postcard in an embodiment of the invention.
Figure 12:
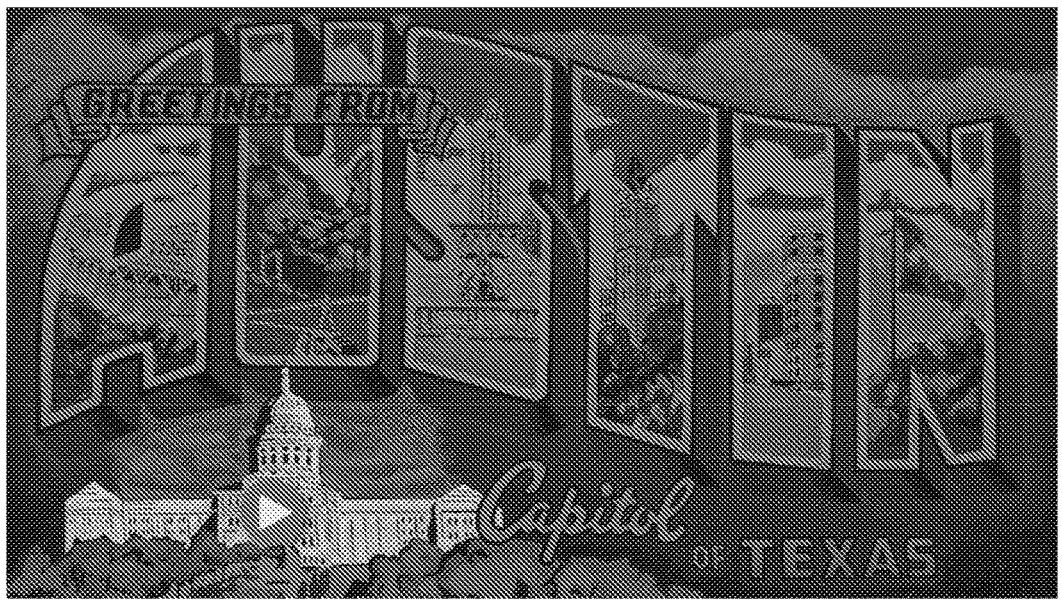
Figure 13:
Figure 14:
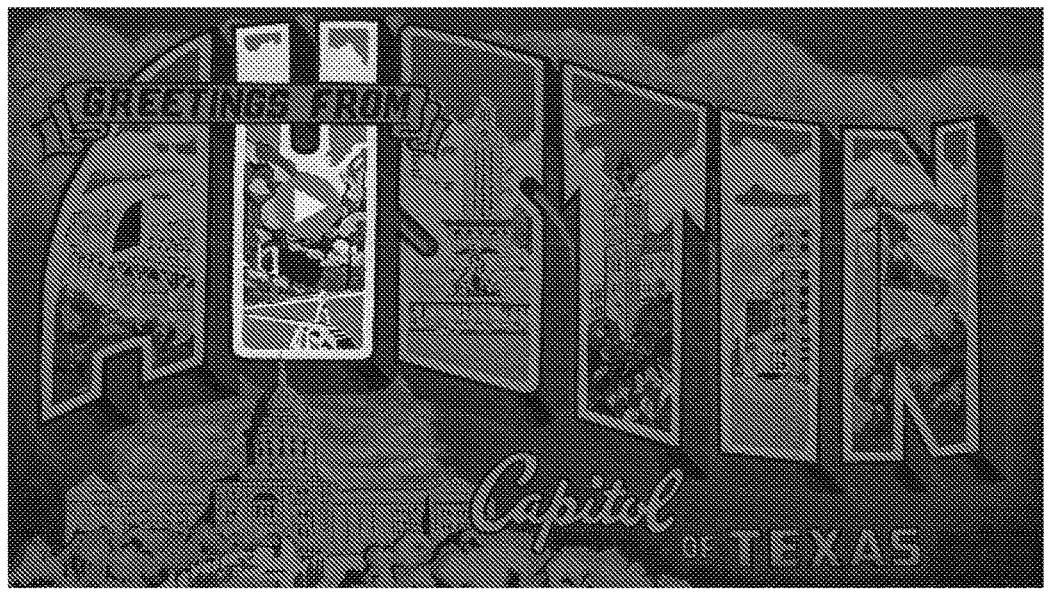
Figure 15:
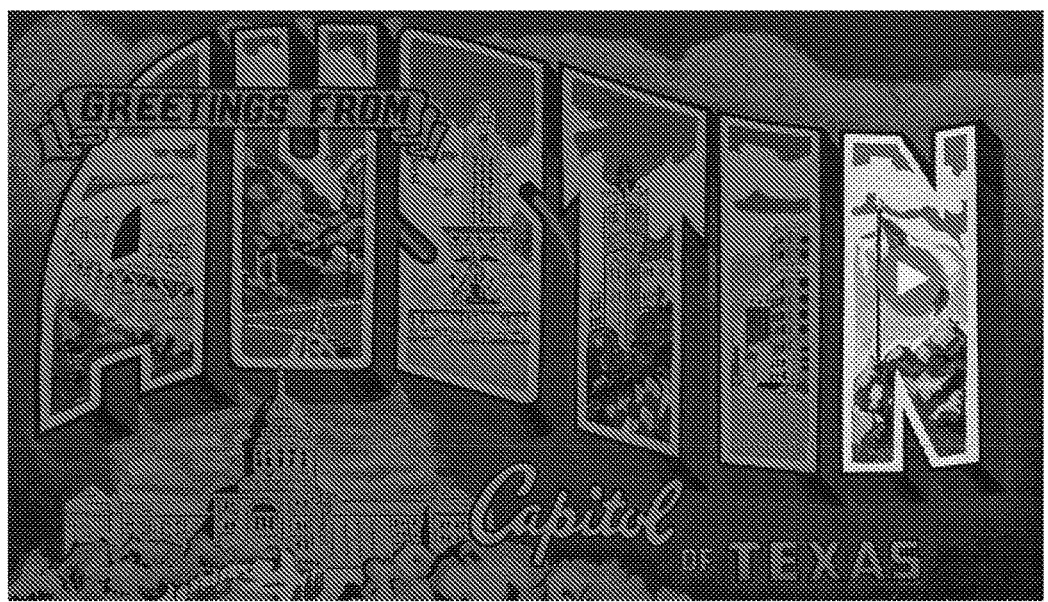

FIGS. 11 to 15 illustrate an example video player where the appearance and functionality of the standard video player have been replaced with a dynamic, virtual postcard for the city of Austin, Tex. In FIG. 11, the postcard player provides an interface to play seven different videos using a single embed code. FIG. 12 shows that the Texas State Capitol is highlighted when the viewer hovers over the building. By clicking the Texas State Capitol, the video in FIG. 13 is displayed. If the viewer clicks the X, the video closes, and the postcard in FIG. 11 is again shown. FIGS. 14 and 15 demonstrate that individual letters are highlighted when the viewer hovers over them. Similar to the Texas State Capitol, when the viewer clicks a highlighted letter of AUSTIN, a video is shown with the option to close the video via the X.

The postcard-player example demonstrates the ability to customize the appearance and behavior of a video player by providing an appearance player module, which includes source code and images to alter the standard video player. The postcard player can be used in a variety of use cases, including: (1) a map of a resort, theme park, or city highlighting key attractions and destinations, and (2) a product diagram with videos explaining each component.

Figure 16:
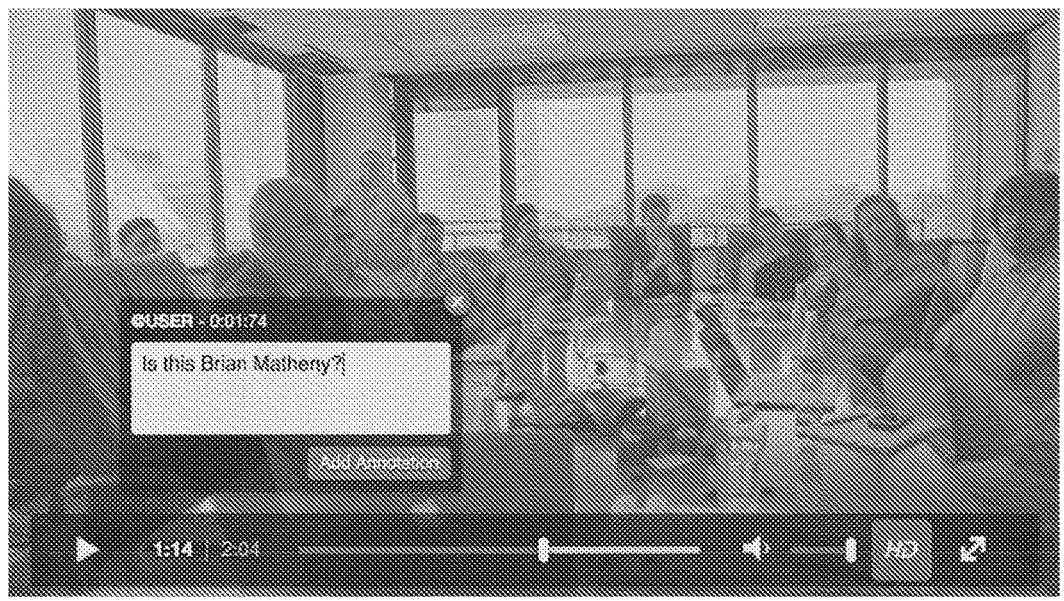
FIGS. 16-17 include an annotation player module in an embodiment of the invention.
Figure 17:
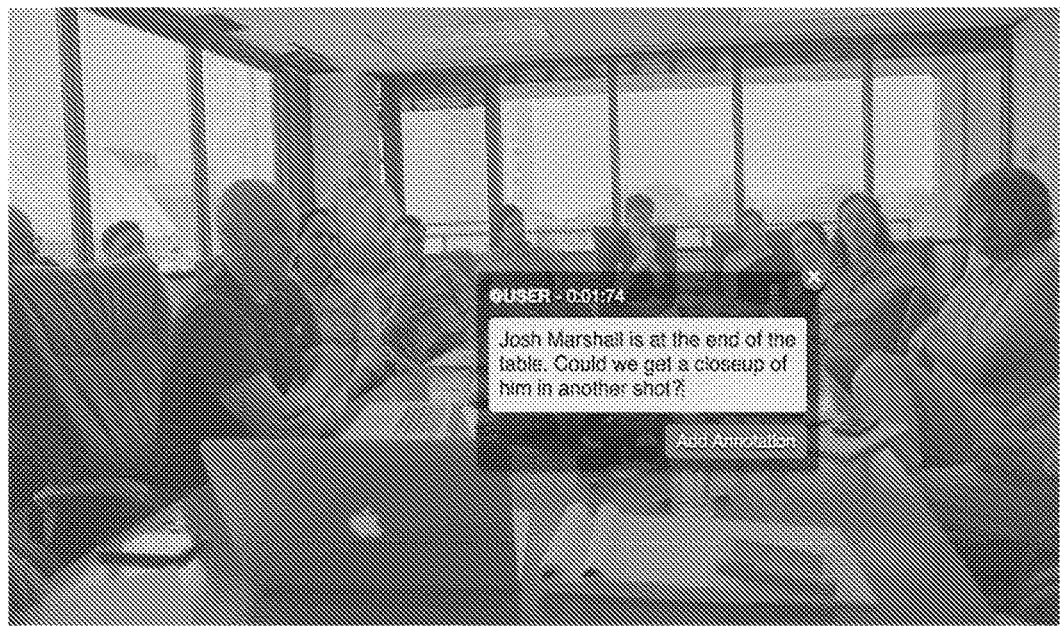

FIGS. 16 and 17 provide an example of a player module added to a standard video player that can capture annotations from a viewer. In FIG. 16 the viewer first pauses the video and then clicks a certain location within the video playback area. The annotations player module prompts the viewer for an annotation. After the viewer submits an annotation, the text inputted along with various metadata, including the video playback timestamp and the coordinates of the click, are sent by the annotations player module to at least one of a database, a server, or a third-party service as specified in the annotation player module's configuration. An analytics module may analyze this information (e.g., click coordinates). Similarly, FIG. 17 shows that the viewer can input and submit an annotation while the video is playing (not paused). When the viewer clicks the video playback area to input an annotation, the video is paused. Once the viewer has submitted the annotation, the video playback resumes. Upon resumption, the video may resume where it left off or may resume with a live video stream.

The appearance, layout, and functionality of the annotations prompt are determined by the annotations player module and its module configuration. The annotations player module is valuable for a variety of use cases, including: (1) gathering feedback from customers about product support videos, (2) capturing questions in a question-and-answer session during a live stream video, and (3) collecting comments from a video editor during a video post-production workflow about whether a clip within the video should be altered or removed.

Figure 18:
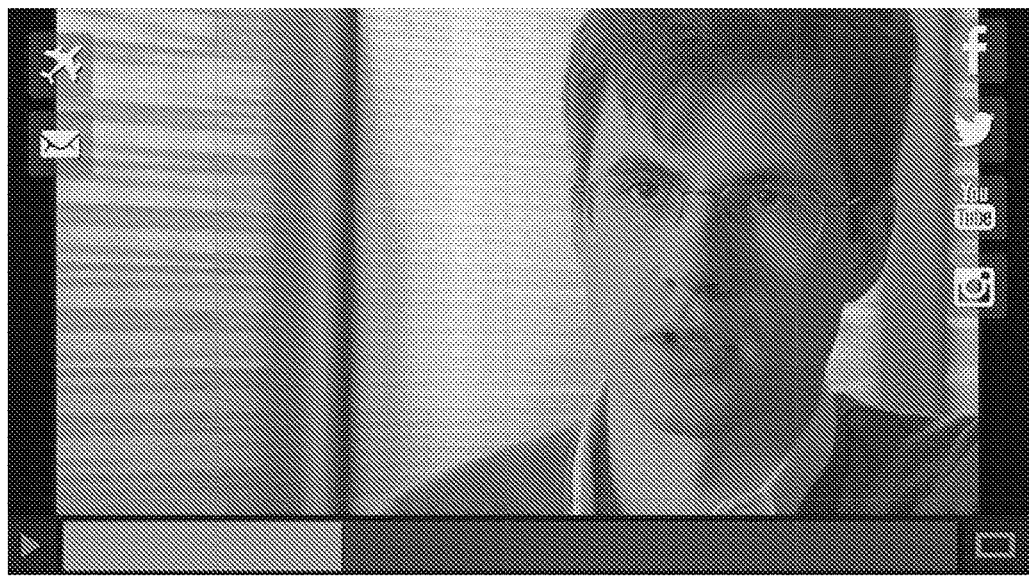
FIGS. 18-23 include a user interface in an embodiment of the invention.

FIGS. 18 to 23 display an example video player where multiple player modules can be included in tandem to achieve an interactive video experience. In this example an author is promoting his new book through an online video campaign and a book-signing tour as seen in FIG. 18. The interactive video player enables a viewer to order tickets to a book-signing event, to subscribe to a mailing list to receive information about upcoming events, and to engage with the author through standard social-media outlets.

Figure 19:
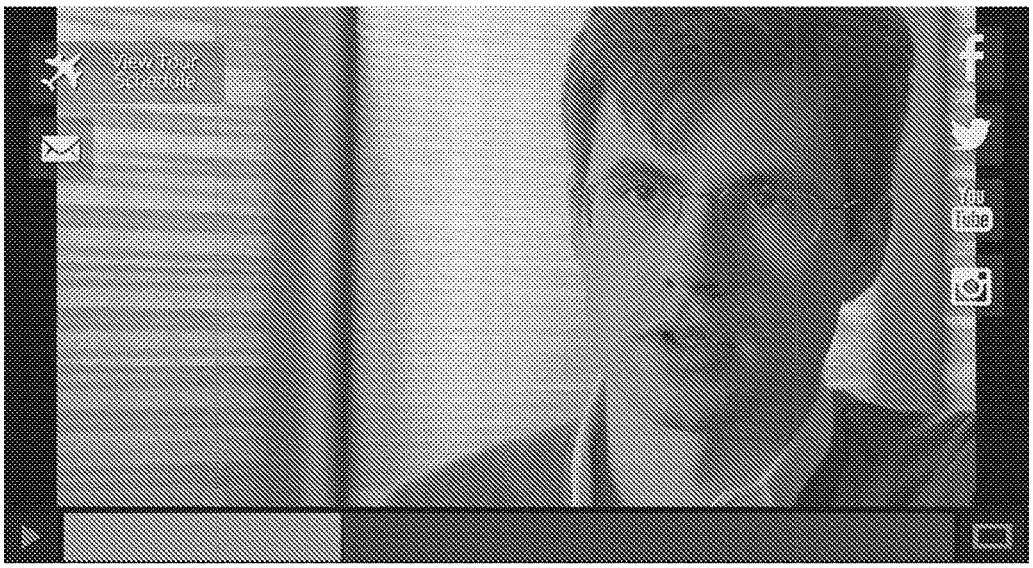
Figure 20:
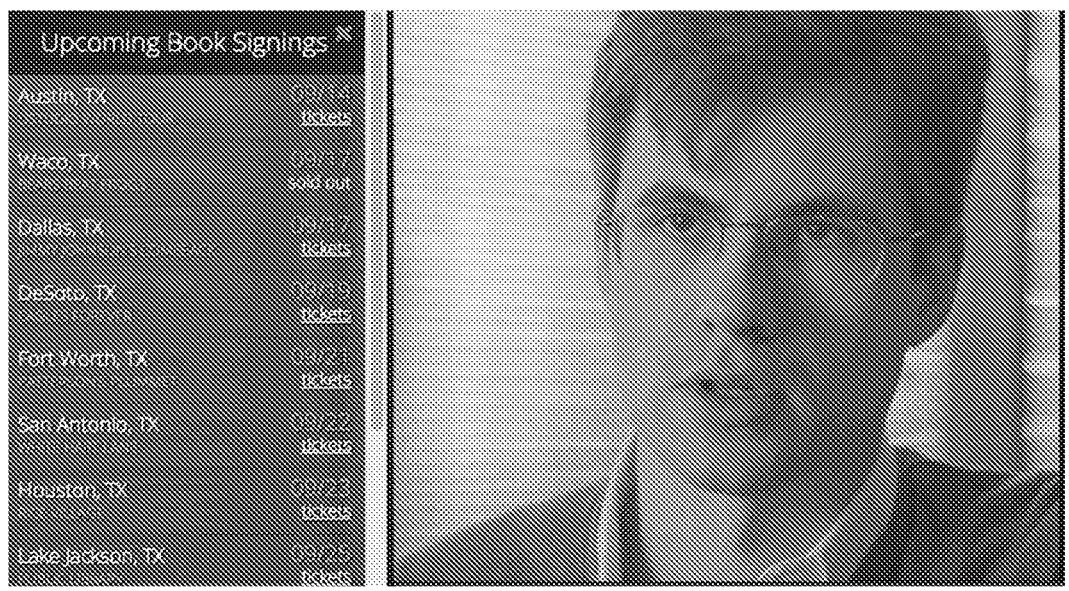

The campaign's video player utilizes interactive video by employing three player modules in addition to a standard video player. The first player module enables viewers to order tickets to a book-signing event. In FIG. 19 by hovering over the airplane icon, the viewer is prompted with the book-signing tour schedule. If the viewer clicks the airplane icon, FIG. 20 lists dates and locations for the upcoming book signings, indicates whether the book-signing is sold out, and provides a link to a third-party ticket vendor. The information listed in FIG. 20 is retrieved by the tickets player module from an external server or service.

Figure 21:
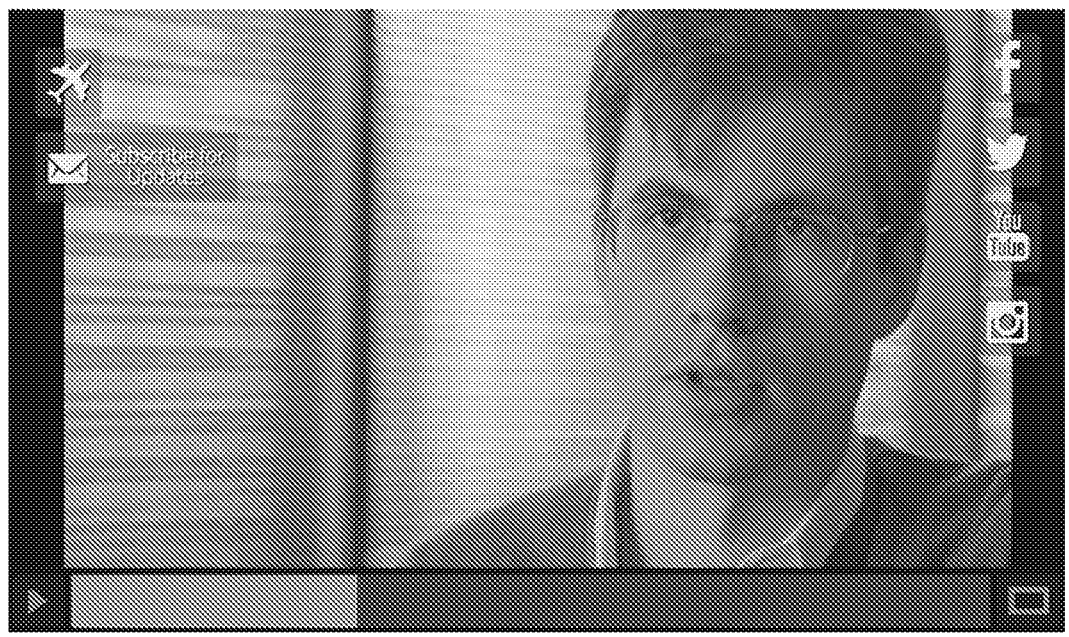
Figure 22:
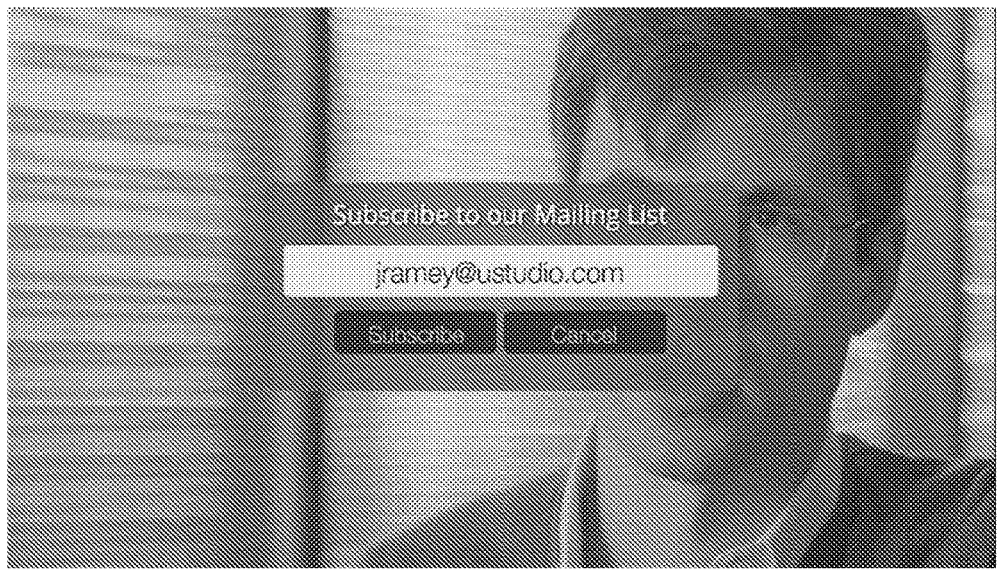

FIG. 21 shows that a viewer can subscribe to a mailing list for updates and upcoming events from the author. The second player module is responsible for the appearance, layout, and functionality of the subscriptions capability within the video player. The subscriptions player module allows a user to interact with the envelop icon by hovering over it. After the viewer clicks the envelope icon, FIG. 22 displays the prompt for the viewer to input a valid email address. If the email address is invalid, an error message is shown to the viewer by the subscriptions player module, and the viewer may input another email address. After the viewer inputs a valid email address, the email address is sent to at least one of a database, a server, or a third-party service as specified in the subscriptions player module's configuration.

Figure 23:
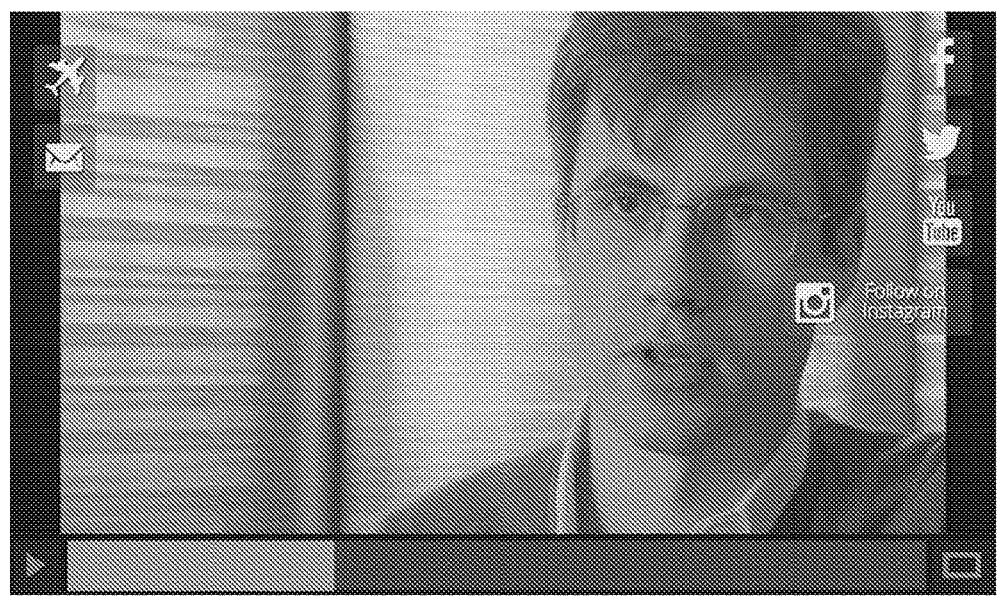

The third player module adds social-media capabilities to the video player. FIG. 23 displays four icons of social-media outlets on the right-hand side of the video player. The appearance and functionality of each icon is determined by the social-media module. For instance, FIG. 23 shows that hovering over the fourth social-media icon changes its appearance and displays more information about the social-media platform. If the viewer clicks this icon, the viewer is taken to the social-media website. The social-media player module also enables a viewer to display the author's social media posts and interaction with other users after clicking the social-media icon.

The interactivity demonstrated in the author's campaign example can be applied to many use cases, including: (1) selling concert tickets within a music video, (2) allowing conference attendees to book hotels and rental cars directly from the video, and (3) selling registration passes from the video to promote an upcoming conference.

Figure 24:
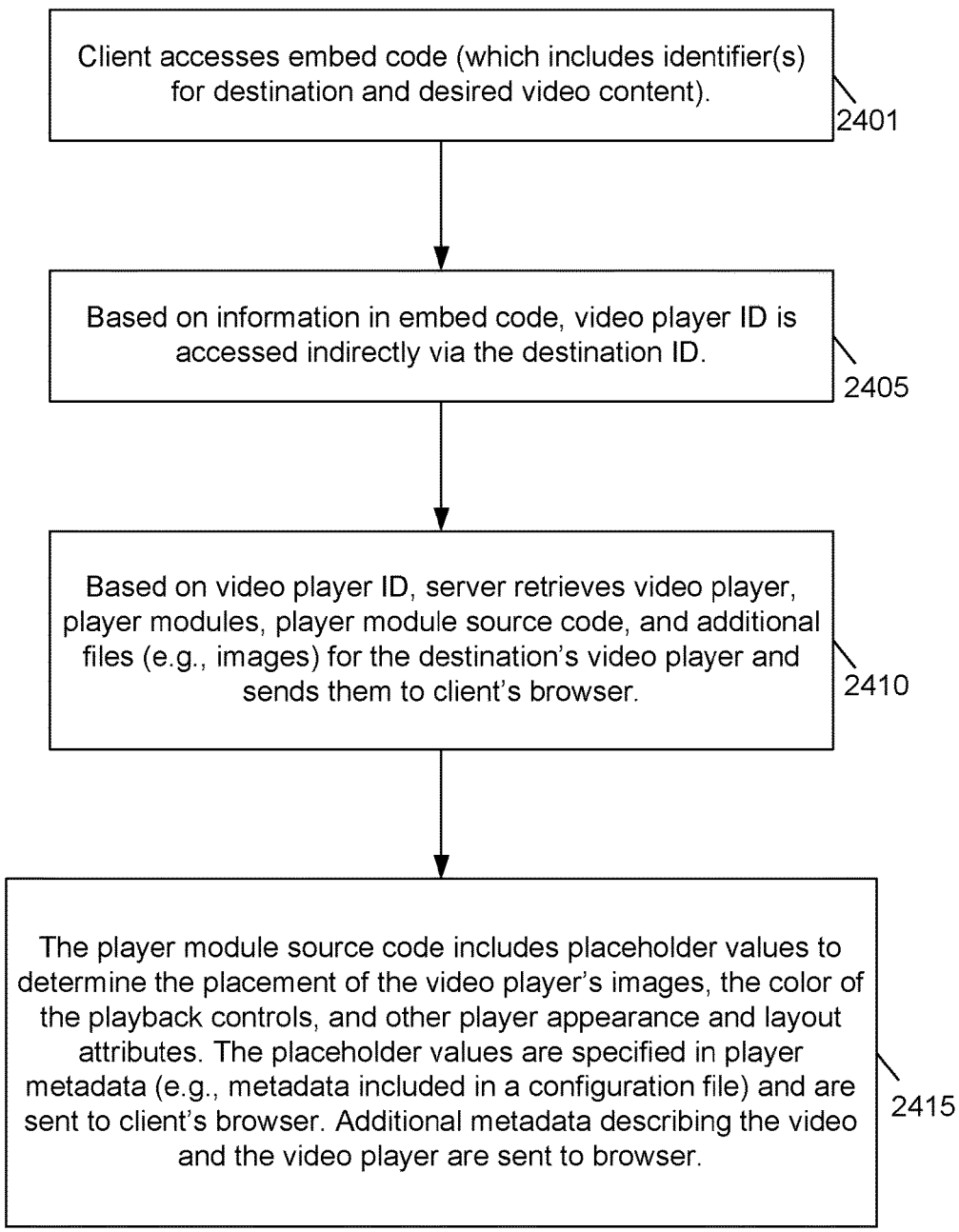
FIG. 24 includes a process for player and player module deployment in an embodiment.
Figure 25:
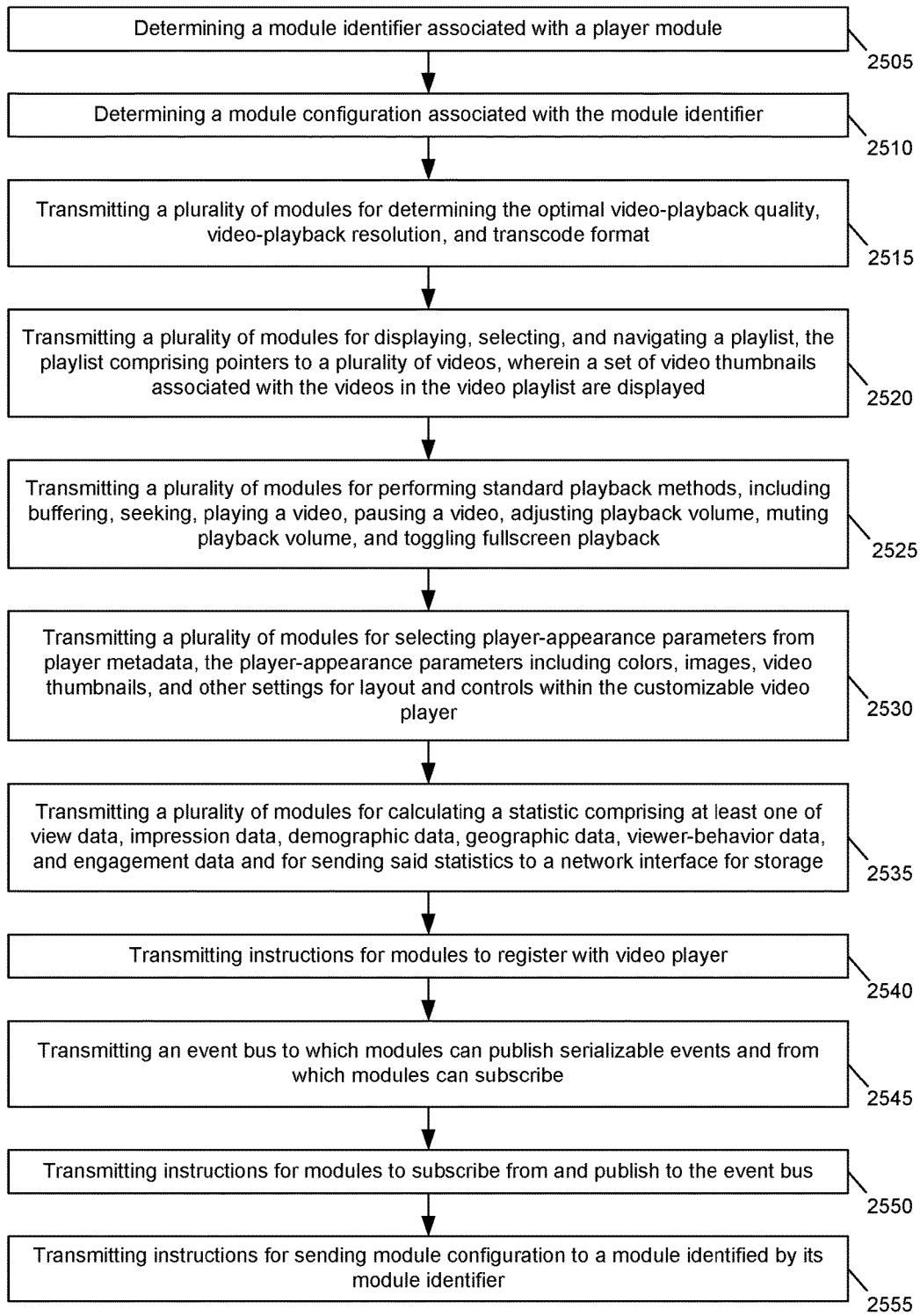
FIG. 25 includes a process for player module deployment in an embodiment.

FIG. 24 displays a flowchart with the steps employed when a video player is loaded from the player framework by a viewer. For example, a viewer named Alice requests a video from her browser using the example embed code, https://embed.ustudio.com/embed/DpTPknry4Pc7/UFpuc1MT4vpP. In this example, the embed code includes the video's unique identifier, UFpuc1MT4vpP, and the destination's unique identifier, DpTPknry4Pc7. The two identifiers may collectively be thought of as a single identifier. The destination ID instructs the server to retrieve the destination's video player (albeit indirectly) designated for HTML5 video within a browser. The server retrieves the player modules, their source code, and additional files (e.g., images) for the destination's video player and sends them to Alice's browser. The source code includes placeholder values to determine, for example, the placement of the video player's images, the color of the playback controls, and all other player appearance and layout attributes. The placeholder values are specified in player metadata (e.g., metadata included in a configuration file) and are sent to Alice's browser. Additional metadata describing the video (e.g., summary of the contents of the video) and the video player are sent to Alice's browser. The video player ID is accessed indirectly via the destination ID to provide security for the video player.

Thus, in block 2401 the client accesses embed code, which includes identifier(s) for destination and desired video content. In block 2405, based on information in embed code, video player ID is accessed indirectly via the destination ID. In block 2410, based on video player ID, the server retrieves player modules, player module source code, and additional files (e.g., images) for the destination's video player and sends them to the viewer's browser. In block 2415 the player module source code includes placeholder values to determine the placement of the video player's images, the color of the playback controls, and other player appearance and layout attributes. The placeholder values are specified in player metadata (e.g., metadata included in a configuration file) and are sent to the viewer's browser. Additional metadata describing the video and the video player are sent to browser.

Continuing with Alice's example, the player ID (e.g., 85766461-b79e-4858-8b1a-6513d6a248af) references a set of player modules to include within the player sent to Alice's browser in FIG. 24. In blocks 2505 and 2510, each of the player modules sent to Alice's browser include player-module identifiers and player-module configurations. A player module is uniquely identified by its identifier. Using a player module identifier, the video player loads the player module, the player module's source code, and the player module's configuration.

Blocks 2515 to 2535 list a set of default player modules included with a video player. These default modules can be altered or replaced with another set of player modules or removed entirely. In block 2515, the default player module named uStudioQuality having ID 428ba555-a5d4-4771-a362-136ad764492f is loaded and sent to Alice's browser. The uStudioQuality module determines that the Alice's browser supports playback of MP4 videos with a resolution up to 1920×1080. Because Alice's network bandwidth would result in an extensive loading time of the MP4 video, the uStudioQuality module identifies that the optimal transcode to retrieve from the server is a 1152×720 transcode, resulting in a faster load time.

In block 2520, the default player module named uStudioPlaylist having ID 240ea199-95bd-4565-9283-3f560c2f10ad retrieves the location of the 1152×720 MP4 transcode specified for video UFpuc1MT4vpP. If multiple videos are available for the embed code provided by Alice, then transcodes for each video in the video playlist would be made available to the player.

In block 2525, the default player module named uStudioPlayer having ID e9e003b2-91f4-471b-a360-04f1afbe5416 is responsible for performing standard playback methods, including buffering, seeking, playing a video, pausing a video, adjusting playback volume, muting playback volume, and toggling fullscreen playback.

In block 2530, the default player module named uStudioUI having ID ddcdad8b-4d14-494f-a17b-8b60c89b3de2 is responsible for determining the player appearance and layout using both static and dynamic controls and assets. An example static asset would be the video thumbnail displayed to Alice before Alice clicks the Play button. Contrarily, the color and size of the Play button are dynamically determined by the uStudioUI player module by selecting and retrieving these player-appearance parameters from player metadata. In the Alice example, the small, centered, and orange Play button is specified in the player module's CSS and resembles the Play button in FIG. 12. The location of the CSS file is specified in the player module's configuration, and the CSS file is loaded by the uStudioUI player module. The source code for the uStudioUI player module is destination-specific: for instance, the uStudioUI player module is written in the proprietary Brightscript language for Roku OTT devices. In contrast, the uStudioUI player module determines the player's layout and appearance in HTML, CSS, and JavaScript in the Alice example. This flexibility to change the layout within a variety of devices and frameworks is a major strength of an embodiment of the invention.

In block 2535, the default player module named uStudio-Analytics having ID 66f3fe6d-b791-40c1-b461-dfe48aa515e2 tracks and captures basic viewership, impression, demographic data, geographic, viewer-behavior, and engagement data. For instance, Alice clicks the player's pause button and resumes watching 30 seconds later. Alice then rewinds the video 15 seconds after she checked her email. In both cases, Alice's actions of pausing, resuming, and rewinding the video in addition to the timestamps and similar data are captured by the uStudioAnalytics module and sent to a server specified in the uStudioAnalytics's player module.

In block 2540, the video player enables custom player modules to register with the player to alter functionality, layout, and appearance. In the Alice example, a custom player module named CustomTrackingModule having ID 8cd7dc7b-1df1-4597-acf5-01bdbecdf626 is registered with the player framework using the same mechanism discussed in FIG. 3. The purpose of the player module is to track the movement of Alice's mouse within the browser as a proxy for where on the screen Alice is looking. As Alice moves her mouse, a Mouse.moved event is triggered along with the x-y coordinates of the mouse's location. The CustomTrackingModule player module also tracks other user behavior, such as left clicks, right clicks, and whether the browser window loses focus. Each event from the CustomTrackingModule player module is published to a server provided in the player-module configuration. The CustomTrackingModule player module is written in JavaScript, a language supported by Alice's browser. If a similar player module were created for a different destination (e.g., Roku®, Apple TV®), a different programming language may be required to implement the module.

In blocks 2545 and 2550, player events are published to a serializable event bus for communication between modules. By publishing or subscribing to events, player modules may perform operations dependent on the events published by other modules rather than their specific code implementations. In the Alice example, the CustomTrackingModule player module subscribes via the event bus to the events published by the uStudioPlayer player module in order to capture the context in which Alice moves her mouse. For instance, when Alice pauses the video, the CustomTrackingModule player module subscribes to the Player.pause event published by the uStudioPlayer player module while also tracking Alice's mouse movement. In addition to sending the x-y coordinates of Alice's mouse movement to the server specified in the player module's configuration, the CustomTrackingModule player module also sends the player's pause state, allowing downstream analyses to better understand the context of Alice's mouse movements.

In block 2555, the player retrieves and sends a player module's configuration to the player module using the player module's ID. In the Alice example, the CustomTrackingModule player module's configuration lists the events, including Player.pause, to which the player module will subscribe when sending to the server specified in the player module's configuration.

Figure 9:
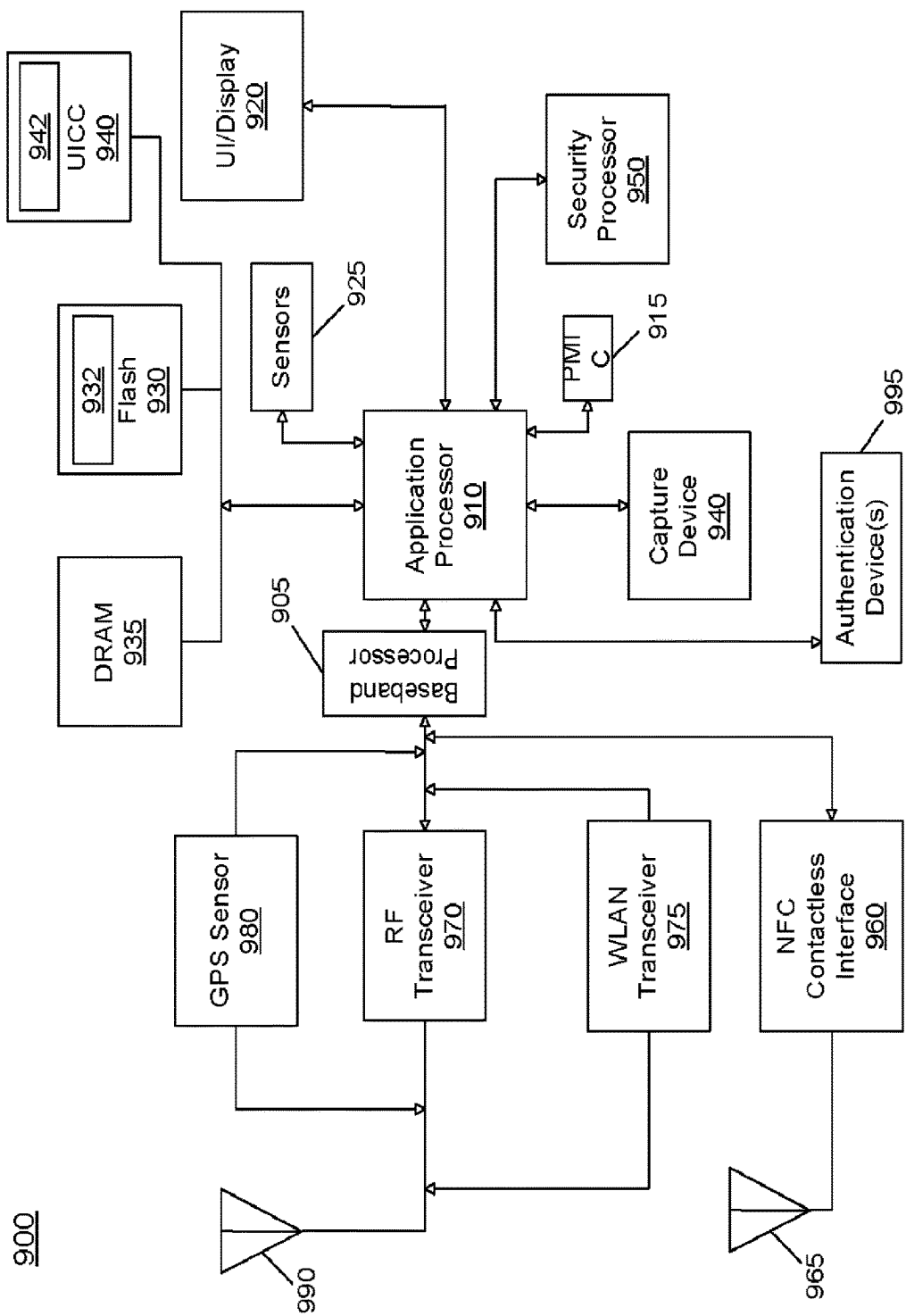
FIGS. 9, 26 and 27 include systems for implementing embodiments of the invention.

Referring now to FIG. 9, shown is a block diagram of an example system with which embodiments can be used (e.g., the client system for FIG. 4). As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

A universal integrated circuit card (UICC) 940 comprises a subscriber identity module, which in some embodiments includes a secure storage 942 to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, for example, user biometric input for use in authentication operations.

As further illustrated, a near field communication (NFC) contactless interface 960 is provided that communicates in a NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Figure 26:
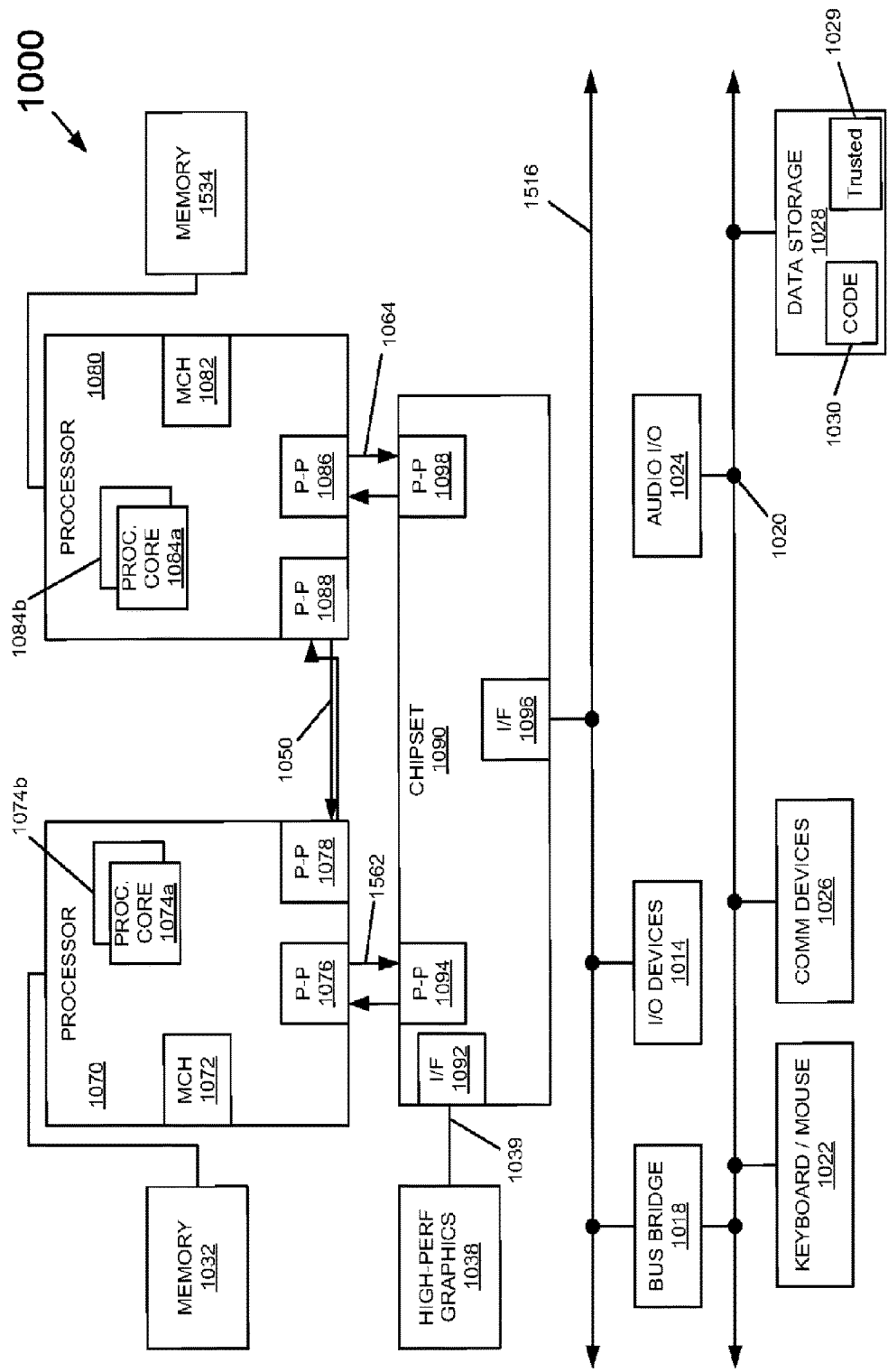

Referring now to FIG. 26, shown is a block diagram of a system (e.g., server of FIG. 4) in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. Chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 27:
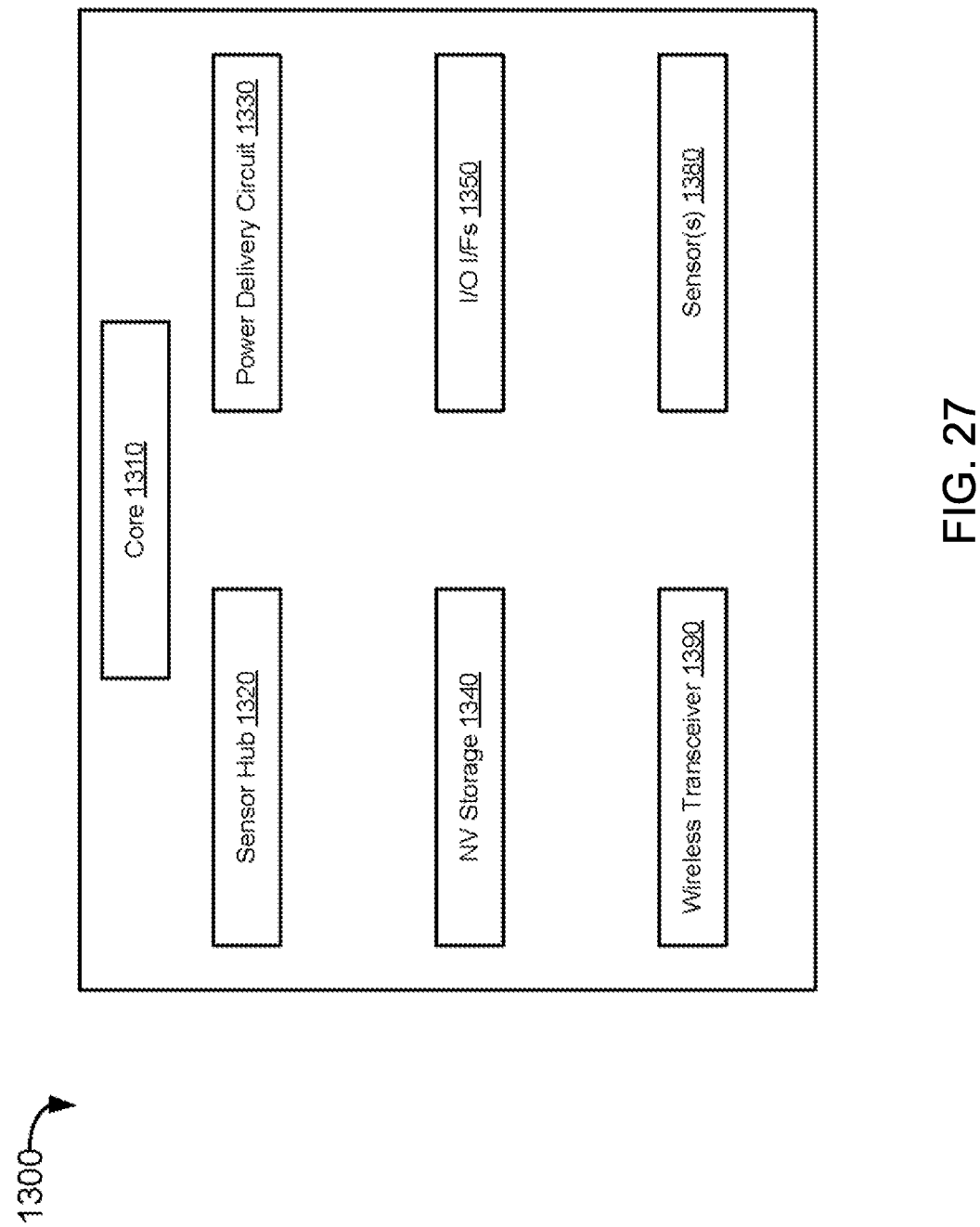

Embodiments may be used in environments where IoT devices may include wearable devices or other small form factor IoT devices. Referring now to FIG. 27, shown is a block diagram of a wearable module 1300 (or, for example, a module that may fit in a refrigerator and the like that has a video screen or which may couple to a tv that lacks wireless connectivity) in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Example 1a includes at least one non-transitory machine readable medium comprising instructions that when executed on a computing device cause the computing device to perform a method for creating a customizable video player comprising: (A) transmit to a client, a publisher interface comprising: (A) (1) a module identifier associated with a player module; (A) (2) a module configuration associated with the module identifier; (A) (3) a plurality of modules for determining the optimal video-playback quality, video-playback resolution, and transcode format; (A) (4) a plurality of modules for displaying, selecting, and navigating a playlist, the playlist comprising pointers to a plurality of videos, wherein a set of video thumbnails associated with the videos in the video playlist are displayed; (A) (5) a plurality of modules for performing standard playback methods, including buffering, seeking, playing a video, pausing a video, adjusting playback volume, muting playback volume, and toggling fullscreen playback; (A) (6) a plurality of modules for selecting player-appearance parameters from player metadata, the player-appearance parameters including colors, images, video thumbnails, and other settings for layout and controls within the customizable video player; (A) (7) a plurality of modules for calculating a statistic comprising at least one of view count, impressions, demographic data, geographic data, viewer-behavior data, and engagement data and for sending said statistics to a server for storage; (A) (8) instructions for modules to register with the customizable video player; (A) (9) an event bus to which modules can publish serializable events and from which modules can subscribe; (A) (10) instructions for modules to subscribe from and publish to an event bus via a network interface; (A) (11) instructions for sending module configuration to a module identified by its module identifier; (B) receiving from the client, player metadata selected by a publisher to determine the player appearance and layout via the publisher interface; (C) receiving from the client, player metadata selected by a publisher via the publisher interface; (D) generating a player identifier, the player identifier associated with the received player metadata, player modules, player-module metadata, and player-module configuration; (E) storing the player identifier in association with the received player metadata, modules, module metadata, and module configuration; (I) generating an embed code referencing the player identifier and module identifiers, the embed code configured such that when the customizable via player is requested from a web site, over-the-top (OTT) player, or any other video-playback device, configures the client to load the customizable video player having appearance, layout, and functionality specified by the player metadata, modules, and module configurations associated with the player identifier, and configures the customizable video player to play the videos specified in the playlist associated with the player identifier; and (J) providing the generated embed code to the client for display via the publisher interface.

Example 2a includes the method of example 1, wherein a module can be registered with the customizable video player referencing the module identifier.

Example 3a includes the method of example 1a, wherein a module can be replace a module within the customizable video player referencing the module identifier.

Example 4a includes the method of example 1a, wherein a module can be alter the instructions of another module within the customizable video player referencing the module identifier.

Example 5a includes the method of example 1a, wherein the publisher interface further comprises controls for inputting player metadata.

Example 6a includes the method of example 1a, wherein the publisher interface further comprises controls for inputting module metadata referencing the module identifier.

Example 7a includes the method of example 1a, wherein the publisher interface further comprises controls for inputting module configuration for a module identified by its module identifier.

Example 8a includes the method of example 1, wherein a plurality of videos are associated with a publisher account, and the playlist includes all of the videos associated with the publisher account.

Example 9a includes the method of example 8a, wherein a set of video thumbnails associated with the videos in the video playlist are displayed.

Example 10a includes the method of example 1a, wherein a plurality of videos are associated with a publisher account, and the playlist includes a subset of the videos associated with the publisher account.

Example 11a includes the method of example 10a, wherein a set of video thumbnails associated with the videos in the video playlist are displayed.

Example 12a includes the method of example 1a, wherein the plurality of modules includes a module a main viewing window for displaying the video and a playlist window adjacent to the main viewing window for displaying the selectable video playlist, their associated metadata, including video title, video description, and playback duration, and the selectable thumbnails associated with the videos in the video playlist.

Example 13a includes an apparatus comprising means for performing any one of examples 1a to 12a.

Example 14a includes a communications device arranged to carry out a method according to any one of examples 1a to 12a.

Example 15a includes a system for creating a customizable video player, the system comprising: a processor; coupling the computing device to a first medium that includes at least one of a physical storage medium and a network; a computer-readable storage medium storing instructions executable by the processor including instructions for instantiating a player module registry, adapted to: (A) transmit to a client, a publisher interface comprising: (a)(i) a module identifier associated with a player module; (a)(2) a module configuration associated with the module identifier; (a)(3) a plurality of modules for determining the optimal video-playback quality, video-playback resolution, and transcode format; (a)(4) a plurality of modules for displaying, selecting, and navigating a playlist, the playlist comprising pointers to a plurality of videos, wherein a set of video thumbnails associated with the videos in the video playlist are displayed; (a)(5) a plurality of modules for performing standard playback methods, including buffering, seeking, playing a video, pausing a video, adjusting playback volume, muting playback volume, and toggling fullscreen playback; (a)(6) a plurality of modules for selecting player-appearance parameters from player metadata, the player-appearance parameters including colors, images, video thumbnails, and other settings for layout and controls within the customizable video player; (a)(7) a plurality of modules for calculating a statistic comprising at least one of viewership data, impression data, demographic data, geographic data, viewer-behavior data, and engagement data and for sending said statistics to a network interface for storage; (a)(8) instructions for modules to register with the customizable video player; (a)(9) an event bus to which modules can publish serializable events and from which modules can subscribe; (a)(10) instructions for modules to subscribe from and publish to an event bus via a network interface; (a)(11) instructions for sending module configuration to a module identified by its module identifier; (B) receiving from the client, player metadata selected by a publisher to determine the player appearance and layout via the publisher interface; (C) receiving from the client, player metadata selected by a publisher via the publisher interface; (D) generating a player identifier, the player identifier associated with the received player metadata, player modules, player-module metadata, and player-module configuration; (E) storing the player identifier in association with the received player metadata, modules, module metadata, and module configuration; (F) generating an embed code referencing the player identifier and module identifiers, the embed code configured such that when the customizable via player is requested from a web site, over-the-top (OTT) player, or any other video-playback device, configures the client to load the customizable video player having appearance, layout, and functionality specified by the player metadata, modules, and module configurations associated with the player identifier, and configures the customizable video player to play the videos specified in the playlist associated with the player identifier; and (G) providing the generated embed code to the client for display via the publisher interface. The system may include a memory storing a player database adapted to store the generated player identifier in association with the received player metadata including the playlist and the received player-appearance and player-layout parameters. The system may include a memory storing a module database adapted to store the generated module identifier in association with the received module metadata and module configuration.

Example 16a includes the system of example 15a further comprising: a publisher account database, coupled to the player module registry, adapted to store an association between the publisher and the player identifier.

Example 17a includes the system of example 15a, wherein the embed code forms at least a part of a uniform resource locator.

Example 18a includes the system of example 15a, wherein a module can be registered from at least one of an application program interface (API), a client application, and an end user via the first medium referencing the module identifier.

Example 19a includes the system of example 15a, wherein a module can be removed referencing the module identifier from at least one of an application program interface (API), a client application, and an end user via the first medium referencing the module identifier.

Example 20a includes the system of example 15a, wherein a module can be updated referencing the module identifier from at least one of an application program interface (API), a client application, and an end user via the first medium referencing the module identifier.

Example 21a includes the system of example 15a, wherein a module can be authorized for distribution to a destination referencing the module identifier from at least one of an application program interface (API), a client application, and an end user via the first medium referencing the module identifier.

Example 22a includes the system of example 15a, wherein a module can be unauthorized for distribution to a destination referencing the module identifier from at least one of an application program interface (API), a client application, and an end user via the first medium.

Example 23a includes the system of example 15a, further comprising a network interface, wherein the network interface is adapted to receive the player identifier from a client, and to provide the player metadata associated with the player identifier to the client.

Example 24a includes the system of example 23a, further comprising a video server coupled to the network interface, adapted to receive from the client a request for a video and to respond to the request by providing the video.

Example 25a includes the system of example 24a, further comprising a video database coupled to the video server, and wherein the video server is adapted to provide the video to the client from the video database.

Example 26a includes the system of example 15a, further comprising a playlist database, adapted to store a plurality of playlists and, for each playlist, a set of content associated with the playlist.

Example 27a includes the system of example 26a, wherein the content is video content.

Example 28a includes the system of example 15a, wherein the player module registry is further adapted to: * receive the player identifier and player metadata from the publisher, and to associate the new player metadata with the player identifier in the player database.

Example 29a includes the system of example 28a, further comprising a network interface adapted to receive the player identifier from a client, and to provide the player metadata associated with the player, including the new player metadata, to the client.

Example 30a includes the system of example 28a, wherein the new player metadata replaces a player metadata already associated with the player identifier.

Example 31a includes the system of example 15a, wherein the plurality of modules includes a module a main viewing window for displaying the video and a playlist window adjacent to the main viewing window for displaying the selectable video playlist, their associated metadata, including video title, video description, and playback duration, and the selectable thumbnails associated with the videos in the video playlist.

Example 32a includes the system of example 15a, further comprising a network interface, wherein the network interface is adapted to receive the module identifier from a client, and to provide all of module instructions associated with the module identifier to the client.

Example 33a includes the system of example 15a, further comprising a network interface, wherein the network interface is adapted to receive the module identifier from a client, and to provide a subset of module instructions associated with the module identifier to the client.

Example 34a includes at least one machine readable medium comprising a plurality of instructions that in response to being executed on a computing device, cause the computing device to carry out a method according to any one of examples 15a to 33a.

Example 1b includes a method executed by at least one processor comprising: receiving a first request for first video content and a first video player from a first remote computing node; in response to receiving the first request, (a)(i) obtaining first source code for the first video player, (a)(ii) obtaining a first configuration file for the first video player, (a)(iii) obtaining a first player module corresponding to the first video player, and (a)(iv) communicating the first video content, the first source code, the first configuration file, and the first player module to the first remote computing node; wherein the first video player comprises a plurality of instructions that in response to being executed on at least one computing device, cause the at least one computing device to play video (e.g., files or video streams) via a graphical user interface; wherein the first player module comprises a plurality of instructions which, in response to being executed on the at least one computing device and further in response to the first player module subscribing to a first event bus of a publication-subscription messaging system, cause the at least one computing device to perform a first routine in response to: (b)(i) a first publication to the first event bus from an additional player module that corresponds to the first video player, and (b)(ii) execution of a first callback function corresponding to the first publication.

Another version of Example 1b includes a method executed by at least one processor comprising: receiving a first request for first video content and a first video player from a first remote computing node; in response to receiving the first request, (a)(i) obtaining first source code for the first video player, (a)(ii) obtaining a first configuration file for the first video player, (a)(iii) obtaining a first player module corresponding to the first video player, and (a)(iv) communicating the first video content, the first source code, the first configuration file, and the first player module to the first remote computing node; wherein the first video player comprises a plurality of instructions that in response to being executed on at least one computing device, cause the at least one computing device to play video (e.g., files or video streams) via a graphical user interface; wherein the first player module comprises a plurality of instructions which, in response to being executed on the at least one computing device and further in response to the first player module subscribing to a first event bus of a publication-subscription messaging system, cause the at least one computing device to perform a first routine in response to: (b)(i) a first publication to the first event bus from an additional player module that corresponds to the first video player, and (b)(ii) execution of a first callback function corresponding to the first publication.

For instance, a file server (e.g., FIG. 26) may receive the first request and then distribute the first source code, first configuration file, and first player module to the first remote computing node. The first remote computing node may include, for example, the systems of FIGS. 9 and/or 27. Such a system may include, for example, the client node used by "Alice" with regard to FIG. 24. Such a client node may include the "at least once computing node" of Example 1b. Further, "obtaining" first source code and the like may include downloading the code from a distant computing node, moving code from one memory (e.g., memory 1028 of FIG. 26) to another memory (e.g., cache 1032 of FIG. 26), and the like. Further, communicating the information may include a push and/or pull between computing nodes.

A media player (e.g., video player) is a computer program for playing multimedia files. Media players may display standard media control icons known from physical devices such as tape recorders and CD players, such as Play, Pause, and Stop buttons. Some conventional operating systems have at least one built-in media player. For example, Windows® comes with Windows Media Player while OS X comes with QuickTime Player. Linux distributions may also come with a media player, such as SMPlayer, Amarok, Audacious, Banshee, MPlayer, Rhythmbox, Totem, VLC, and xine.

In software architecture, publish-subscribe is a messaging pattern where senders of messages, called publishers, do not program the messages to be sent directly to specific receivers, called subscribers, but instead characterize published messages into classes without knowledge of which subscribers, if any, there may be. Similarly, subscribers express interest in one or more classes and only receive messages that are of interest, without knowledge of which publishers, if any, there are. This pattern provides greater network scalability and a more dynamic network topology.

In the pub/sub model, subscribers typically receive only a subset of the total messages published. The process of selecting messages for reception and processing is called filtering. There are two common forms of filtering: topic-based and content-based both of which may be used by embodiments described herein. In a topic-based embodiment, messages are published to "topics" or named logical channels. Subscribers in a topic-based system will receive all messages published to the topics to which they subscribe, and all subscribers to a topic will receive the same messages. The publisher is responsible for defining the classes of messages to which subscribers can subscribe. In a content-based embodiment, messages are only delivered to a subscriber if the attributes or content of those messages match constraints defined by the subscriber. The subscriber is responsible for classifying the messages. Some embodiments support a hybrid of the two where publishers post messages to a topic while subscribers register content-based subscriptions to one or more topics.

Example 2b includes the method of example 1b, wherein the receiving a first request for first video content and a first video player includes receiving the first request via at least one embed code corresponding to at least one specific identifier for the first video content and the first video player.

The connections may be direct or indirect. For example, the specific identifier may point to a destination identity that then points to a player identity.

In an embodiment the "embed code" is a block of code (e.g., HTML) which is embedded in the page-source and creates an object in doing so.

Example 3b includes the method of example 1b, wherein in response to receiving the first request, the method comprises: (a)(i) obtaining second and third player modules corresponding to the first video player, and (a)(ii) communicating the second and third player modules to the first remote computing node.

In an embodiment the first, second, and third player modules may be sent to the remote computing node in any order and may be sent relatively close in time to one another (e.g., milliseconds) or longer (e.g., minutes, hours, days). For example, the second player module may assess the destination configuration of the remote node whereas the first player module may be a module that focuses on mouse movement by the user of the second node (which may occur only after destination configuration has been assessed).

Example 4b includes the method of example 3b, wherein: in response to the second player module being subscribed to the first event bus, the second player module publishes second metadata to the first event bus; and the second metadata concerns at least one member from the group comprising: video-playback resolution for the first remote computing node and transcode format for the first remote computing node.

Subscriptions to an event bus may occur solely on the client remote computing node in some embodiments. However, in other embodiments the event bus may be located away from the remoting computing node (e.g., on the same server that receives the first request or on another server). In some embodiments the event bus may be distributed among various nodes including the remote computing node.

Example 5b includes the method of example 4b, wherein in response to the third player subscribing to the first event bus and further in response to the second player publishing the second metadata, the method comprises: (a)(i) loading a fourth player module, but not a fifth player module, from a group of player modules that include the fourth and fifth player modules and that all correspond the first video, and (a)(ii) and communicating the fourth player module, but not the fifth player module, to the first remote computing node.

Thus, it is important to note there may be multitudes of player modules all configured to serve the same purpose (e.g., execute the same routine, such as analytics regarding usage of video including, but not limited to, where user watching the video is located and/or how many times the user paused the video), but may be ideal for different destinations. In such a case, there may be different versions of the same player module appropriate for destinations of varying resolution or bandwidth. In such a case a selection of a player module may be made based on metadata for destination bandwidth. In such a case, only one of the fourth and fifth player modules is sent to the remote computing node. The other player module would not be sent to, for example, preserve precious memory space in the client (e.g., Smartwatch).

Example 6b includes the method of example 4b, wherein in response to the third player subscribing to the first event bus and further in response to the second player publishing the second metadata, the method comprises: (a)(i) loading a fourth player module corresponding to the first video player, and (a)(ii) and communicating the fourth player module to the first remote computing node.

Example 7b includes the method of example 6b, wherein each of the first, second, third, and fourth player modules comprises independent source code that executes independently of other player modules and that communicates with other player modules via the event bus.

Thus, the modules relate to modular programming. Modular programming is a software design technique that emphasizes separating the functionality of a program into independent, interchangeable modules, such that each module contains everything necessary to execute only one aspect of the desired functionality. A module interface expresses the elements that are provided and required by the module. The elements defined in the interface are detectable by other modules. The implementation contains the working code that corresponds to the elements declared in the interface. Modular programming is closely related to structured programming and object-oriented programming, all having the same goal of facilitating construction of large software programs and systems by decomposition into smaller pieces. While historically usage of these terms has been inconsistent, today "modular programming" refers to high-level decomposition of the code of an entire program into pieces, structured programming to the low-level code use of structured control flow, and object-oriented programming to the data use of objects, a kind of data structure.

Example 8b includes the method of example 7b wherein each of the first, second, third, and fourth player modules have callback functions registered with a library of the first video player.

A callback is a piece of executable code that is passed as an argument to other code, which is expected to call back (execute) the argument at some convenient time.

Example 9b includes the method of example 1b comprising: receiving a second request for a second video player from the first remote computing node; in response to receiving the second request, (a)(i) obtaining second source code for the second video player, (a)(ii) obtaining a second configuration file for the second video player, (a)(iii) obtaining an additional first player module corresponding to the second video player, (a)(iv) and communicating the second source code, the second configuration file, and the additional first player module to the first remote computing node; wherein the additional first player module performs a second routine in response to (b)(i) a second publication to the second event bus from another video player module that corresponds to the second video player, and (b)(ii) execution of a second callback function corresponding to the second publication.

For instance, "Alice" may use a mobile computing node (e.g., FIG. 9) to view video content within a browser and then again using an application, such as YouTube®. The video may be the same video or different videos. This may require different video players (because Alice's single computing node still has two different destinations with the browser being a destination and YouTube being a destination), which would be called for via different embed codes that Alice uses to access the content. The video players may have different source code, configuration files, player modules, and the like. The video players may have entirely different user interfaces.

Example 10b includes the method of example 9b wherein the first and second video players have different user interfaces from one another.

Example 11b includes the method of example 3b, wherein (a) the second player module publishes second metadata to the first event bus, and (b) the third player module communicates a call to action (CTA) in response to the published second metadata.

For example, see FIG. 4.

A CTA may include, for example, text, an image, a video, or a variety of other file types.

Example 12b includes the method of example 11b, wherein the second metadata corresponds to an event and the third player module subscribes to the event.

Example 13b includes the method of example 12b, wherein the first, second, and third player modules each respectively include source code, a configuration file, and metadata.

Example 14b includes the method of example 1b comprising: receiving a second request for the first video content and the first video player from a second remote computing node; and in response to receiving the second request, (a)(i) obtaining the first source code for the first video player, (a)(ii) obtaining a second configuration file for the first video player, (a)(iii) obtaining an additional first player module corresponding to the first video player, and (a)(iv) communicating the first video content, the first source code, the second configuration file, and the additional first player module to the second remote computing node; wherein the additional first player module comprises a plurality of instructions that, in response to being executed on at least one computing device and the additional first player module subscribing to a second event bus of a publication-subscription messaging system, cause the at least one computing device to perform a second routine in response to: (b)(i) a second publication to the second event bus from another player module that corresponds to the first video player, and (b)(ii) execution of a second callback function corresponding to the second publication.

For example, Alice may use the same code two different times over the course of two weeks. During that time a content provider may change configuration files for the same player that the embed code calls for (indirectly). As a result, the "play" button may have changed colors or styles or position based on the change in configuration files. The "additional first player module" may have been a module added to the player by the content provider during the two week period.

Example 15b includes the method of example 14b, wherein the first and second configuration files include differing configurations for the first and second remote computing nodes based on the first remote computing node employing a first graphical user interface and the second remote computing nodes employing a second graphical user interface.

Example 16b includes an apparatus comprising means for performing any one of examples 1b to 15b.

Example 17b includes at least one machine readable medium comprising a plurality of instructions that in response to being executed on the at least one computing device, cause the at least one computing device to carry out a method according to any one of examples 1b to 15b.

Example 18b includes at least one storage medium having instructions stored thereon for causing a processor-based system to perform steps comprising: in response to communicating a first request for first video content and a first video player to a first remote computing node, receiving from the first remote computing node: (a)(i) first source code for the first video player, (a)(ii) a first configuration file for the first video player, and (a)(iii) a first player module corresponding to the first video player; and in response to receiving the first player module, subscribing the first player module to a first event bus of a publication-subscription messaging system; wherein the first video player comprises a plurality of instructions that in response to being executed on the system, cause the system to play video files or video streams via a graphical user interface; wherein the first player module comprises a plurality of instructions which, in response to being executed on the system, cause the system to perform a first routine in response to: (b)(i) a first publication to the first event bus from an additional player module that corresponds to the first video player, and (b)(ii) execution of a first callback function corresponding to the first publication.

Example 19b includes the at least one medium of example 18b comprising instructions to: (a)(i) obtain second and third player modules corresponding to the first video player, (a)(ii) subscribe the second and third player modules to the first event bus, and (a)(iii) publish second metadata to the first event bus via the second player module; wherein the second metadata concerns at least one member from the group comprising: video-playback resolution for the first remote computing node and transcode format for the first remote computing node.

Example 20b includes the at least one medium of example 19b comprising instructions to cause the third player module to load a fourth player module corresponding to the first video player in response to the second player publishing the second metadata and the third player module subscribing to the second metadata.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While embodiments of the invention have been described with respect to a limited number of embodiments, those skilled in the art will appreciate numerous modifications and variations therefrom. It is intended that the appended claims cover all such modifications and variations as fall within the true spirit and scope of embodiments of the invention.

What is claimed is:

1. At least one non-transitory machine-readable medium having stored thereon data which, if used by at least one machine, causes the at least one machine to perform operations comprising:
  receiving a first request for first video content and a first video player from a first remote computing node;
  in response to receiving the first request, (a)(i) obtaining first source code for the first video player, (a)(ii) obtaining a first configuration file for the first video player, (a)(iii) obtaining a first player module corresponding to the first video player, and (a)(iv) communicating the first video content, the first source code, the first configuration file, and the first player module to the first remote computing node;
  wherein the first video player comprises data which, if used by at least one additional machine, causes the at least one additional machine to play video via a graphical user interface;
  wherein the first player module comprises data which, if used by the at least one additional machine, causes the at least one additional machine to perform a first routine in response to (b)(i) the first player module subscribing to a first event bus of a publication-subscription messaging system, (b)(ii) a first publication to the first event bus from an additional player module that corresponds to the first video player, and (b)(iii) execution of a first callback function corresponding to the first publication.

2. The at least one medium of claim 1, wherein the receiving a first request for first video content and a first video player includes receiving the first request via at least one embed code corresponding to at least one specific identifier for the first video content and the first video player.

3. The at least one medium of claim 1, wherein in response to receiving the first request, the operations comprise: (a)(i) obtaining second and third player modules corresponding to the first video player, and (a)(ii) communicating the second and third player modules to the first remote computing node.

4. The at least one medium of claim 3, wherein:
  in response to the second player module being subscribed to the first event bus, the second player module is configured to publish second metadata to the first event bus; and the second metadata concerns at least one of: video-playback resolution for the first remote computing node or transcode format for the first remote computing node.

5. The at least one medium of claim 4, wherein in response to the third player being subscribed to the first event bus and further in response to the second player publishing the second metadata, the operations comprise: (a)(i) obtaining a fourth player module, but not a fifth player module, from a group of player modules that include the fourth and fifth player modules and that all correspond the first video, and (a)(ii) and communicating the fourth player module, but not the fifth player module, to the first remote computing node.

6. The at least one medium of claim 4, wherein in response to the third player subscribing to the first event bus and further in response to the second player publishing the second metadata, the operations comprise: (a)(i) obtaining a fourth player module corresponding to the first video player, and (a)(ii) and communicating the fourth player module to the first remote computing node.

7. The at least one medium of claim 6, wherein each of the first, second, third, and fourth player modules comprises independent source code that executes independently of other player modules and that communicates with other player modules via the event bus.

8. The at least one medium of claim 7 wherein each of the first, second, third, and fourth player modules has a callback function registered with a library of the first video player.

9. The at least one medium of claim 1 comprising:
receiving a second request for a second video player from the first remote computing node;
in response to receiving the second request, (a)(i) obtaining second source code for the second video player, (a)(ii) obtaining a second configuration file for the second video player, (a)(iii) obtaining an additional first player module corresponding to the second video player, (a)(iv) and communicating the second source code, the second configuration file, and the additional first player module to the first remote computing node;
wherein the additional first player module performs a second routine in response to (b)(i) a second publication to a second event bus from another video player module that corresponds to the second video player, and (b)(ii) execution of a second callback function corresponding to the second publication.

10. The at least one medium of claim 9 wherein the first and second video players have different user interfaces from one another.

11. The at least one medium of claim 3, wherein (a) the second player module is configured to publish second metadata to the first event bus, and (b) the third player module is configured to communicate a call to action (CTA) in response to the published second metadata.

12. The at least one medium of claim 11, wherein the second metadata corresponds to an event and the third player module subscribes to the event.

13. The at least one medium of claim 12, wherein the first, second, and third player modules each respectively include source code, a configuration file, and metadata.

14. The at least one medium of claim 1 comprising:
receiving a second request for the first video content and the first video player from a second remote computing node; and
in response to receiving the second request, (a)(i) obtaining the first source code for the first video player, (a)(ii) obtaining a second configuration file for the first video player, (a)(iii) obtaining an additional first player module corresponding to the first video player, and (a)(iv) communicating the first video content, the first source code, the second configuration file, and the additional first player module to the second remote computing node;
wherein the additional first player module comprises data which, if used by at least one another machine, causes the at least one another machine to perform a second routine in response to (b)(i) the additional first player module subscribing to a second event bus of a publication-subscription messaging system, (b)(ii) a second publication to the second event bus from another player module that corresponds to the first video player, and (b)(iii) execution of a second callback function corresponding to the second publication.

15. The at least one medium of claim 14, wherein the first and second configuration files include differing configurations for the first and second remote computing nodes based on the first remote computing node employing a first graphical user interface and the second remote computing nodes employing a second graphical user interface.

16. At least one non-transitory machine-readable medium having stored thereon data which, if used by at least one machine, causes the at least one machine to perform operations comprising:
in response to communicating a first request for first video content and a first video player to a first remote computing node, receiving from the first remote computing node: (a)(i) first source code for the first video player, (a)(ii) a first configuration file for the first video player, and (a)(iii) a first player module corresponding to the first video player; and
in response to receiving the first player module, subscribing the first player module to a first event bus of a publication-subscription messaging system;
wherein the first video player comprises data which, if used by the at least one machine, causes the at least one machine to play video via a graphical user interface;
wherein the first player module comprises data which, if used by the at least one machine, causes the at least one machine to perform a first routine in response to: (b)(i) a first publication to the first event bus from an additional player module that corresponds to the first video player, and (b)(ii) execution of a first callback function corresponding to the first publication.

17. The at least one medium of claim 16:
wherein the operations comprise (a)(i) obtaining second and third player modules corresponding to the first video player, (a)(ii) subscribing the second and third player modules to the first event bus, and (a)(iii) publishing second metadata to the first event bus via the second player module;
wherein the second metadata concerns at least one of: video-playback resolution for the first remote computing node or transcode format for the first remote computing node.

18. The at least one medium of claim 17 wherein the operations comprise causing the third player module to load a fourth player module corresponding to the first video player in response to the second player publishing the second metadata and the third player module subscribing to the second metadata.

19. A computing system comprising:
means for receiving a first request for first video content and a first video player from a first remote computing node;

means for, in response to receiving the first request, (a)(i) obtaining first source code for the first video player, (a)(ii) obtaining a first configuration file for the first video player, (a)(iii) obtaining a first player module corresponding to the first video player, and (a)(iv) communicating the first video content, the first source code, the first configuration file, and the first player module to the first remote computing node;

wherein the first video player comprises means for playing video via a graphical user interface;

wherein the first player module comprises means for performing a first routine in response to (b)(i) the first player module subscribing to a first event bus of a publication-subscription messaging system, (b)(ii) a first publication to the first event bus from an additional player module that corresponds to the first video player, and (b)(iii) execution of a first callback function corresponding to the first publication.

20. The system of claim 19 comprising:

means for, in response to receiving the first request, (a)(i) obtaining second and third player modules corresponding to the first video player, and (a)(ii) communicating the second and third player modules to the first remote computing node;

wherein, in response to the second player module being subscribed to the first event bus, the second player is configured to publish second metadata to the first event bus;

means for, in response to the third player subscribing to the first event bus and the second player publishing the second metadata, (a)(i) obtaining a fourth player module, but not a fifth player module, from a group of player modules that include the fourth and fifth player modules and that all correspond the first video, and (a)(ii) and communicating the fourth player module, but not the fifth player module, to the first remote computing node.

* * * * *